United States Patent
Takano

(10) Patent No.: US 10,123,256 B2
(45) Date of Patent: Nov. 6, 2018

(54) COMMUNICATION CONTROL FOR MANAGING CONNECTIONS IN A FREQUENCY BAND

(71) Applicant: SONY CORPORATION, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 82 days.

(21) Appl. No.: 14/763,929

(22) PCT Filed: Dec. 2, 2013

(86) PCT No.: PCT/JP2013/082393
§ 371 (c)(1),
(2) Date: Jul. 28, 2015

(87) PCT Pub. No.: WO2014/132514
PCT Pub. Date: Sep. 4, 2014

(65) Prior Publication Data
US 2015/0373623 A1    Dec. 24, 2015

(30) Foreign Application Priority Data
Feb. 28, 2013 (JP) ................................ 2013/038550

(51) Int. Cl.
*H04W 48/08* (2009.01)
*H04W 56/00* (2009.01)
(Continued)

(52) U.S. Cl.
CPC ............. *H04W 48/08* (2013.01); *H04W 4/06* (2013.01); *H04W 56/00* (2013.01);
(Continued)

(58) Field of Classification Search
CPC . H04W 56/0015; H04W 48/08; H04W 56/00; H04W 56/001; H04W 72/0453
See application file for complete search history.

(56) References Cited

U.S. PATENT DOCUMENTS

2014/0098779 A1* 4/2014 Kim ..................... H04B 7/024
                                                                370/329
2014/0226541 A1* 8/2014 Xu ..................... H04W 56/0015
                                                                370/280
(Continued)

FOREIGN PATENT DOCUMENTS

JP        2011-120196 A    6/2011

OTHER PUBLICATIONS

Extended European Search Report for EP Patent Application No. 13876159.8, dated Sep. 16, 2016, 09 pages.
(Continued)

Primary Examiner — Raj Jain
(74) Attorney, Agent, or Firm — Chip Law Group

(57) ABSTRACT

A communication control device including a communication control unit configured to control radio communication in a macro cell that overlaps with part or whole of a small cell. A first frequency band used for the radio communication in the macro cell is synchronized with a second frequency band used for radio communication in the small cell. A synchronization signal used for synchronization in the first frequency band is transmitted in the first frequency band. The communication control unit prevents a terminal device satisfying certain conditions from being connected in a radio resource in the first frequency band. The certain conditions include synchronization of the terminal device in the second frequency band utilizing a synchronization result by the synchronization signal.

19 Claims, 27 Drawing Sheets

(51) Int. Cl.
H04W 4/06 (2009.01)
H04W 72/04 (2009.01)
H04W 16/32 (2009.01)

(52) U.S. Cl.
CPC ..... H04W 56/001 (2013.01); H04W 56/0015 (2013.01); H04W 72/0453 (2013.01); H04W 16/32 (2013.01)

(56) References Cited

U.S. PATENT DOCUMENTS

| | | | | |
|---|---|---|---|---|
| 2014/0357277 | A1* | 12/2014 | Asplund | H04W 48/18 455/437 |
| 2015/0365910 | A1* | 12/2015 | Takano | H04W 84/045 370/338 |
| 2015/0373623 | A1* | 12/2015 | Takano | H04W 56/00 370/329 |
| 2016/0088579 | A1* | 3/2016 | Harada | H04W 48/10 370/336 |

OTHER PUBLICATIONS

"Discussion on deployment scenarios for new carrier types", New Postcom, 3GPP TSG RAN WG1 Meeting #72, St Julian's, Malta, 2013, 03 pages.

"Discussion about dual connectivity", Renesas Mobile Europe, 3GPP TSG-RAN WG2 Meeting #81 Malta, 2013, 03 pages.

"On synchronized New Carrier Type", ZTE, 3GPP TSG-RAN WG1 Meeting #72 St Julian's, Malta, 2013, 02 pages.

Renesas Mobile Europe Ltd., "On Synchronized New Carrier Type", 3GPP TSG RAN WG1 Meeting #72 R1-130415, Jan. 28-Feb.1, 2013, pp. 2, St. Julian's, Malta.

NTT Docomo, "Design for Synchronized New Carrier Type", 3GPP TSG RAN WG1 Meeting #72 R1-130398, Jan. 28-Feb. 1, 2013, pp. 3, St. Julian's, Malta.

Intel Corporation, "Views on Synchronized New Carrier", 3GPP TSG-RAN WG1 #72 R1-130079, Jan. 28-Feb. 1, 2013, pp. 4, St. Julian's, Malta.

* cited by examiner

FIG. 7

| SUPPLY METHOD | UE STATE NECESSARY FOR SUPPLY | SUPPLY TARGET UE (SUPPLIED INFORMATION) | SUPPLIABLE INFORMATION AMOUNT |
|---|---|---|---|
| SYSTEM INFORMATION | RRC_CONNECTED OR RRC_IDLE | ALL UES (INFORMATION COMMON TO UES) | SMALL |
| RRC SIGNALING | RRC_CONNECTED | INDIVIDUAL UE (INDIVIDUAL INFORMATION FOR EACH UE OR INFORMATION COMMON TO UES) | LARGE |

COMMUNICATION CONTROL FOR MANAGING CONNECTIONS IN A FREQUENCY BAND

TECHNICAL FIELD

The present disclosure relates to a communication control device, a communication control method, and a terminal device.

BACKGROUND ART

At present, 4G radio communication systems have been standardized by the Third Generation Partnership Project (3GPP). In 4G, technologies such as carrier aggregation, relay, and Multi-User Multiple-Input Multiple-Output (MU-MIMO) have been noticed.

In particular, carrier aggregation is a technology capable of collectively handling, for example, five frequency bands with a bandwidth of 20 MHz to handle a bandwidth of 20 MHz×5=100 MHz. According to carrier aggregation, an advance in the maximum throughput is expected. Various technologies related to such carrier aggregation have been investigated.

For example, Patent Literature 1 discloses a technology for suppressing deterioration in throughput by controlling assignment of a measurement gap for each component carrier (CC) based on a determination result of urgency of handover.

CITATION LIST

Patent Literature

Patent Literature 1: JP 2011-120196A

SUMMARY OF INVENTION

Technical Problem

On the other hand, in Release 11 of the 3GPP, new carrier types (NCTs) have been investigated as new component carriers apart from legacy CCs (existing CCs) capable of maintaining backward compatibility. Here, the NCTs are assumed to be new types of CCs as well as the CCs of the types. Further, as the NCTs, an NCT (Synchronized New Carrier Type: SNCT) synchronized with the legacy CC and an NCT (Unsynchronized New Carrier Type: UNCT) not synchronized with the legacy CC have been investigated.

The SNCT is synchronized with any legacy CC. Therefore, when a user equipment (UE) establishes synchronization in one CC between the mutually synchronized SNCT and the legacy CC, a synchronization result of the UE in the one CC can be used for the other CC. That is, the UE does not have to establish separate synchronization with a synchronization signal (for example, a common reference signal (CRS)) in the other CC.

The UNCT is not synchronized with any legacy CC, but can be synchronized with different UNCTs. When the UE establishes synchronization in one UNCT among two or more mutually synchronized UNCTs, a synchronization result of the UE in the one UNCT can be utilized for the different CCs. That is, the UE does not have to establish separate synchronization with a synchronization signal in the other CCs.

However, for example, in a case where there are a macro cell and one or more small cells that are partially or entirely overlapping with the macro cell, a large number of UEs located within the macro cell can establish synchronization in a CC of the macro cell by a synchronization signal, and can establish synchronization by utilizing the synchronization result in a CC of the small cell(s). Thus, it is assumed that the large number of UEs are in RRC_Connected in the CC of the macro cell. As a result, a large number of resources (such as memory resources for holding data addressed to the large number of UEs, radio resources for signaling to the large number of UEs, and process resources for signaling to the large number of UEs) in an eNodeB of the macro cell can be consumed.

Thus, it is desirable to provide a mechanism that can suppress the consumption of resources in a base station of a macro cell in a case where a terminal device uses a frequency band of the macro cell in order to utilize a synchronization result.

Solution to Problem

According to the present disclosure, there is provided a communication control device including: a communication control unit configured to control radio communication in a macro cell that overlaps with part or whole of a small cell. A first frequency band used for the radio communication in the macro cell is synchronized with a second frequency band used for radio communication in the small cell. A synchronization signal used for synchronization in the first frequency band is transmitted in the first frequency band. The communication control unit prevents a terminal device satisfying certain conditions from being connected in a radio resource in the first frequency band. The certain conditions include synchronization of the terminal device in the second frequency band utilizing a synchronization result by the synchronization signal.

According to the present disclosure, there is provided a communication control method including: controlling radio communication in a macro cell that overlaps with part or whole of a small cell. A first frequency band used for the radio communication in the macro cell is synchronized with a second frequency band used for radio communication in the small cell. A synchronization signal used for synchronization in the first frequency band is transmitted in the first frequency band. The controlling of the radio communication in the macro cell includes preventing a terminal device satisfying certain conditions from being connected in a radio resource in the first frequency band. The certain conditions include synchronization of the terminal device in the second frequency band utilizing a synchronization result by the synchronization signal.

According to the present disclosure, there is provided a terminal device including: a communication control unit configured to control radio communication performed by the terminal device in a macro cell and a small cell partially or entirely overlapping with the macro cell. A first frequency band used for the radio communication in the macro cell is synchronized with a second frequency band used for the radio communication in the small cell. A synchronization signal used for synchronization in the first frequency band is transmitted in the first frequency band. The communication control unit prevents the terminal device from being connected in a radio resource in the first frequency band when the terminal device satisfies certain conditions. The certain conditions include synchronization of the terminal device in the second frequency band utilizing a synchronization result by the synchronization signal.

Advantageous Effects of Invention

As described above, according to the present disclosure, it becomes possible to suppress the consumption of resources in a base station of a macro cell in a case where a terminal device uses a frequency band of the macro cell in order to utilize a synchronization result.

BRIEF DESCRIPTION OF DRAWINGS

FIG. 7 is an explanatory diagram illustrating characteristics of system information and RRC signaling.

DESCRIPTION OF EMBODIMENTS

Figure 1:
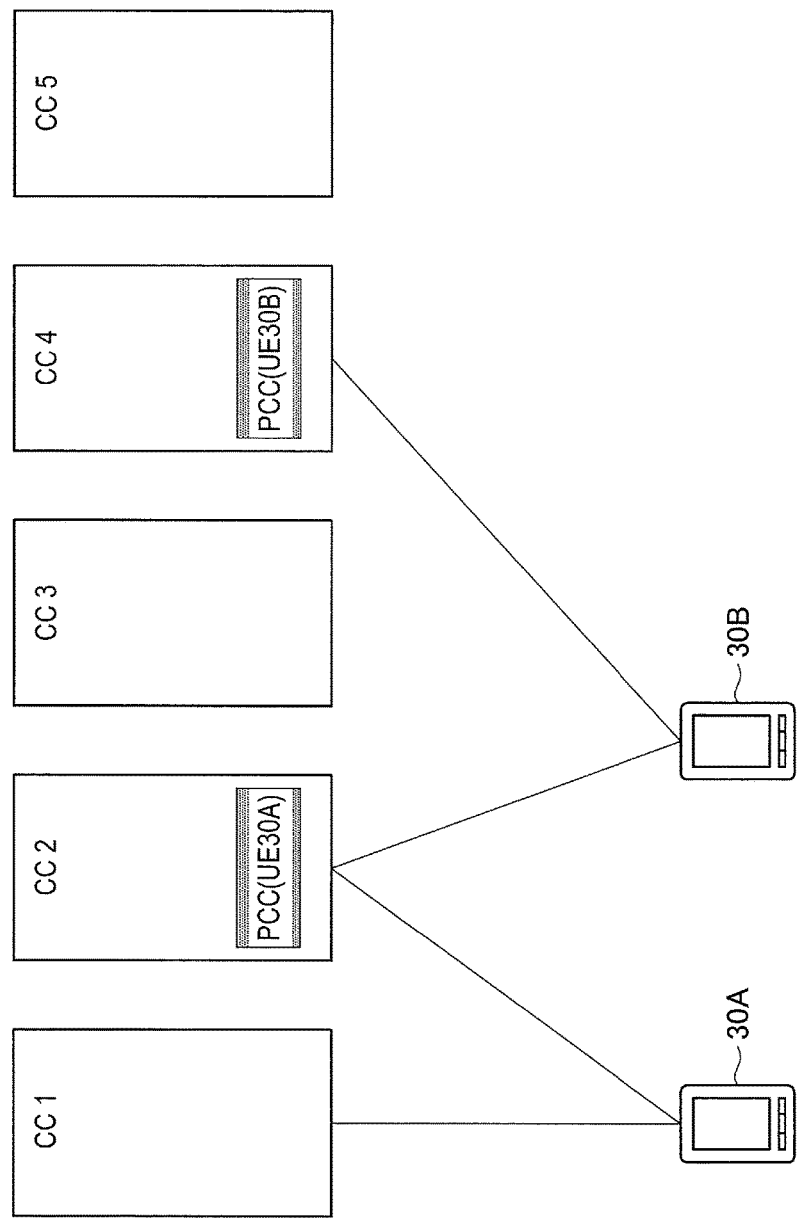
FIG. 1 is an explanatory diagram illustrating an example of a PCC of each UE.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Technology for radio communication in 3GPP
2. Technical problems related to embodiment of the present disclosure
2.1 Examination of synchronization between frequency bands
2.2 Technical problems
3. Schematic configuration of communication system according to the present embodiment
4. First embodiment
4.1. Configuration of macro eNodeB
4.2. Configuration of UE
4.3. Flow of process
4.4. Modification example
5. Second embodiment
5.1. Configuration of macro eNodeB
5.2. Configuration of UE
5.3. Flow of process
6. Application examples
6.1. Applications related to macro eNodeB
6.2. Applications related to UE
7. Conclusion 1. Technology for Radio Communication in 3GPP First, a technology for radio communication in the 3GPP will be described as a premise.
(Carrier Aggregation of Release 10)
Component Carrier
In carrier aggregation of Release 10, up to five component carriers (CCs) are bundled and used by a UE. Each CC is a bandwidth of up to 20 MHz. In carrier aggregation, CCs continuing in a frequency direction are used in some cases and CCs separated in the frequency direction are used in some cases. In carrier aggregation, the CCs to be used can be set for each UE.

Primary CC and secondary CC

In carrier aggregation, one of the plurality of CCs used by the UE is a special CC. The one special CC is referred to as a primary component carrier (PCC). Of the plurality of CCs, the remaining CCs are referred to as secondary component carriers (SCCs). The PCC can differ for each UE. This point will be described more specifically below with reference to FIG. 1.

FIG. 1 is an explanatory diagram illustrating an example of the PCC of each UE. A UE 30A, a UE 30B, and five CCs 1 to 5 are illustrated in FIG. 1. In this example, the UE 30A uses two CCs, the CC 1 and the CC 2. The UE 30A uses the CC 2 as the PCC. On the other hand, the UE 30B uses two CCs, the CC 2 and the CC 4. The UE 30B uses the CC 4 as the PCC. In this way, each UE can use a different CC as the PCC.

Since the PCC is the most important CC among the plurality of CCs, the CC for which communication quality is the stablest is preferable. Which CC is used as the PCC actually depends on the way in which they are installed.

The CC with which a UE initially establishes connection is the PCC for the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE can not use only the SCC, but necessarily uses one PCC.

The PCC is also referred to as a primary cell. The SCC is also referred to as a secondary cell.

Synchronization by UE in CRS

In carrier aggregation, a common reference signal (CRS) is transmitted in each CC. A UE establishes synchronization in each CC by the CRS. In the present specification, "synchronization (by the UE in the CC)" means that the UE adjusts (for example, tracks synchronization) a timing and/or a frequency in reception of a signal so that a signal can be correctly received in the CC. The common reference signal is also referred to as a cell-specific reference signal.

(Background of NCT of Release 11)

In carrier aggregation, each CC has been assumed to be able to be used by a legacy UE (that is, an existing UE) from the viewpoint of guarantee of backward compatibility. However, the definition of a CC that cannot be used by a legacy UE but is more efficient has started to be investigated. That is, definition of new CCs referred to as new carrier types (NCT) or additional carriers has started to be investigated.

The ultimate motivation for the NCT is to reduce overhead of the CCs. Overhead is radio resources other than radio resources utilized to transmit user data. That is, overhead is radio resources utilized for control. When overhead increases, the radio resources that can be utilized to transmit user data may decrease. Therefore, the increase in overhead is not preferable. One cause of overhead is a CRS present in each CC in a downlink. This point will be described more specifically below with reference to FIG. 2.

Figure 2:
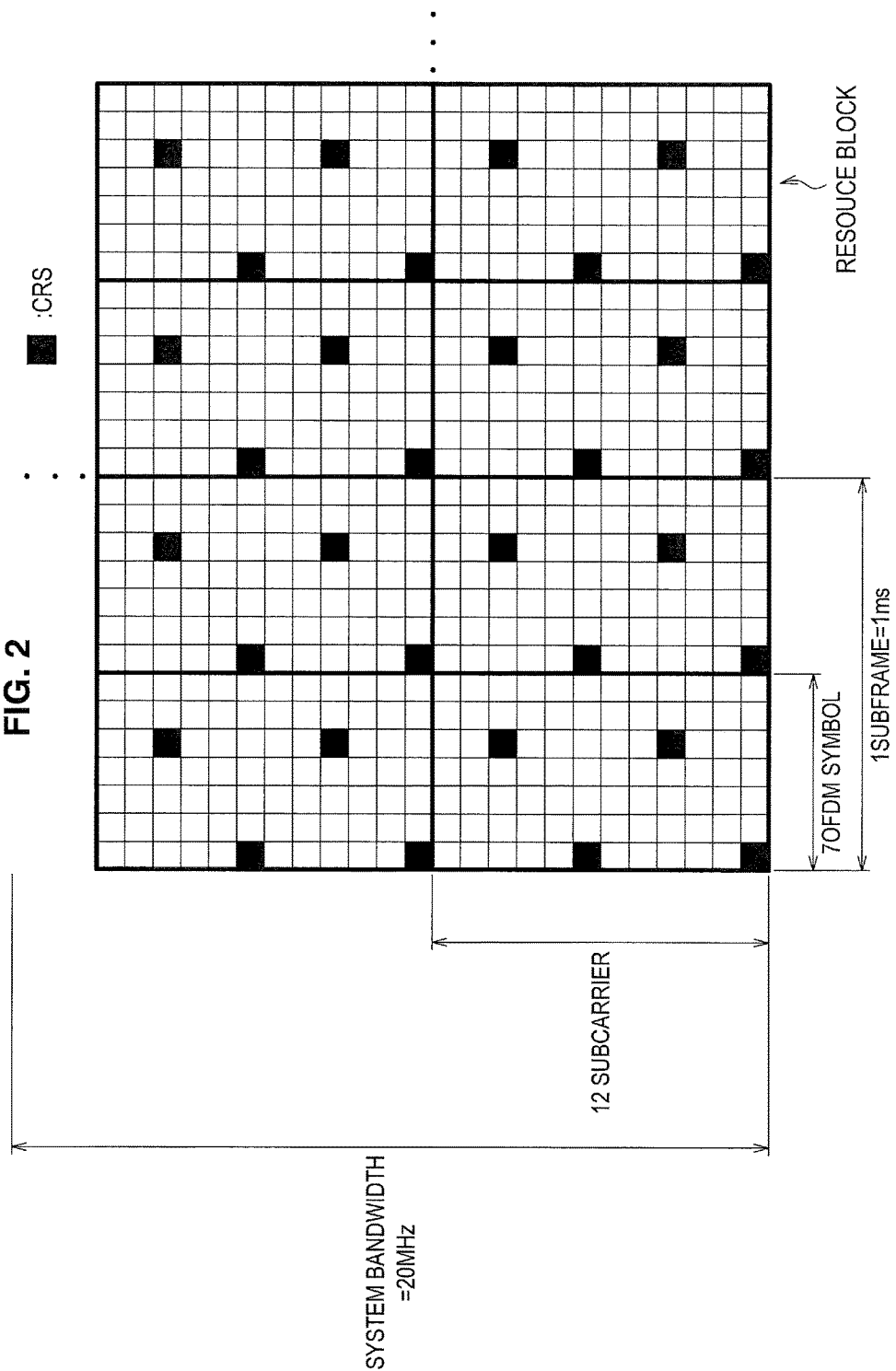
FIG. 2 is an explanatory diagram illustrating an example of a CRS transmitted in a CC on a downlink.

FIG. 2 is an explanatory diagram illustrating an example of a CRS transmitted in a CC on a downlink. Several radio resource blocks (RBs) corresponding to the CCs of 20 MHz are illustrated in FIG. 2. Each RB has a width of 12 subcarriers in a frequency direction and a width of 7 Orthogonal Frequency Division Multiplexing (OFDM) symbols in a time direction. The CRSs are transmitted in each RB. That is, the CRSs are transmitted in all of the RBs present across the bandwidth of the CCs in the frequency direction and present for each slot in the time direction. Accordingly, the CRS is transmitted in each CC and each subframe.

One objective of the CRS is for a UE to establish synchronization. As the synchronization, there is time synchronization (or timing synchronization) which is synchronization in the time direction and frequency synchronization which is synchronization in the frequency direction. The UE can establish synchronization with high precision in the frequency direction and the time direction by the CRS. Further, the UE continues to establish synchronization by the CRS.

Another objective of the CRS is that the UE properly demodulates a downlink signal. The UE demodulates different received signals based on the phases of the CRSs.

The common reference signal (CRS) is the most fundamental reference signal (RS) introduced in Release 8. On the other hand, at present, there is an intermittently transmitted RS such as a channel state information-reference signal (CSI-RS). The RS is used to demodulate a downlink signal. Accordingly, a current objective of the CRS is mainly that the UE can establish synchronization. Therefore, as far as the UE can establish synchronization, the interval at which the CRS is transmitted can be decreased.

(Reduction in CRSs Investigated in NTC in Release 11)

Kinds of NCTs

As the NCTs investigated in Release 11, there are broadly two kinds of NCTs.

One of the two kinds of NCTs is an NCT that is synchronized with a legacy CC (that is, an existing CC). When the UE establishes synchronization in a legacy CC, the UE can utilize a synchronization result of the UE in the legacy CC for the NCT synchronized with the legacy CC. Such an NCT is referred to as a synchronized NCT (hereinafter referred to as an "SNCT"). Further, in the present specification, "utilize the synchronization result (of the UE in the CC) (for a different CC)" means that a reception timing and a reception frequency in the different CC are acquired from a reception timing and a reception frequency in the CC.

The other of the two kinds of NCTs is an NCT that is not synchronized with a legacy CC. The UE necessarily establishes synchronization in an NCT. Such an NCT is referred to as an unsynchronized NCT (hereinafter referred to as an "UNCT"). Since the synchronization process is necessary in the UNCT, the CRSs are transmitted in the UNCT.

As described above, as the NCT, there are the SNCT and the UNCT. Hereinafter, specific examples of the SNCT and the UNCT will be described with reference to FIG. 3.

Figure 3:
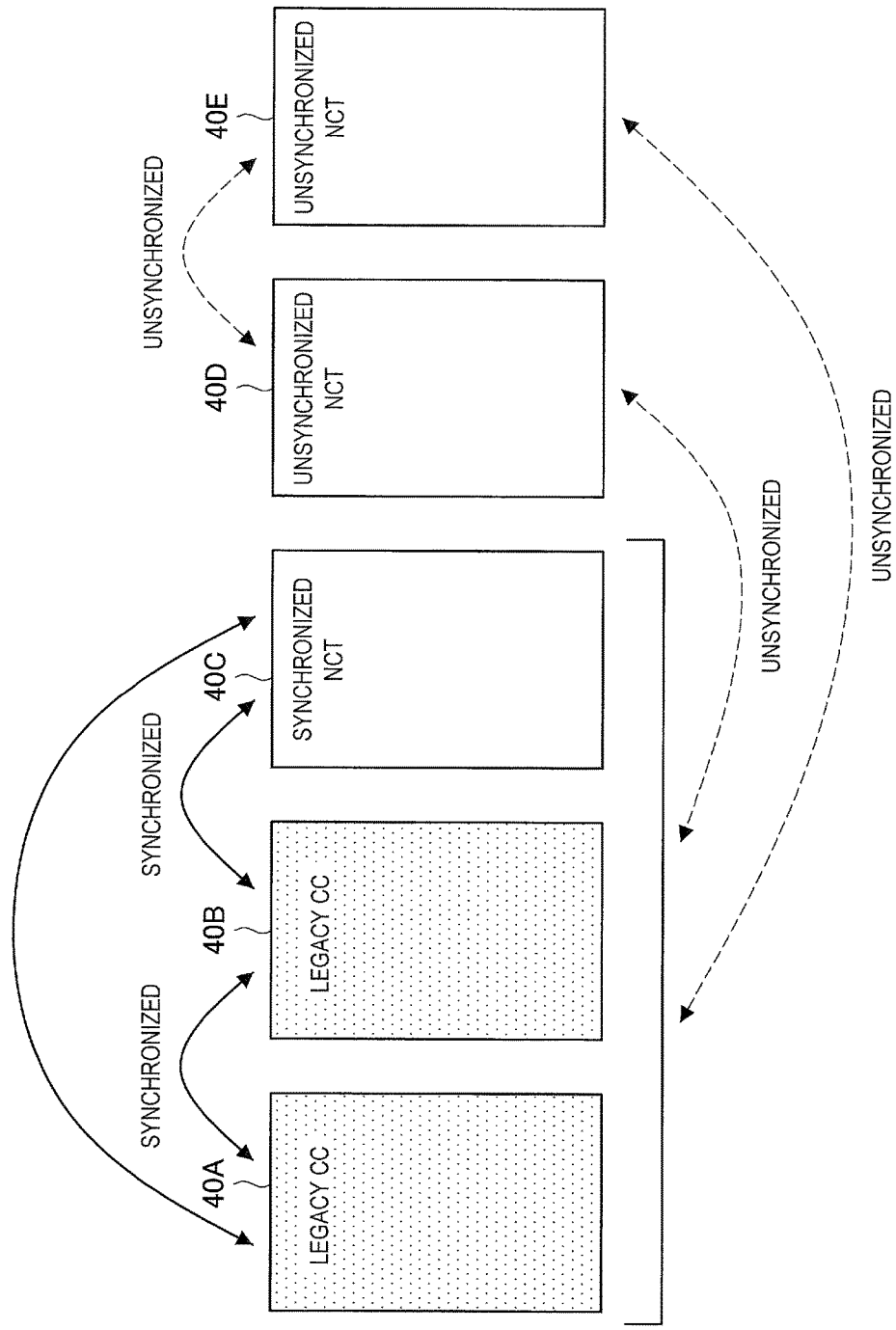
FIG. 3 is an explanatory diagram illustrating examples of NCTs.

FIG. 3 is an explanatory diagram illustrating examples of the NCTs. Five CCs 40 are illustrated in FIG. 3. Of the five CCs 40, a CC 40A and a CC 40B are legacy CCs. In this example, the CC 40A and the CC 40B are mutually synchronized. A CC 40C, a CC 40D, and a CC 40E are the NCTs. More specifically, the CC 40C is an SNCT that is synchronized with both of the CC 40A and the CC 40B which are the legacy CCs. The CC 40D and the CC 40E are UNCTs that are synchronized with neither the CC 40A nor the CC 40B. In this example, the CC 40D and the CC 40E are not mutually synchronized.

Reduction in CRSs in Unsynchronized NCT

Since the CRS transmitted in the legacy CC is transmitted not only to establish synchronization of the UE but also to demodulate a received signal, the CRS is redundant. On the other hand, since the CIS-RS is standardized as an RS for demodulation in releases after Release 10, it is possible to reduce the CRSs. Accordingly, an extent to which CRSs can be reduced while enabling the UE to continuously establish synchronization has been investigated. In particular, a reduction in the CRSs in the frequency direction and a reduction in the CRSs in the time direction have been investigated as the reduction in the CRSs of the unsynchronized NCT (that is, the UNCT).

As the reduction in the CRSs in the frequency direction, for example, the RBs in which the CRSs are transmitted is reduced to 6 RBs, 25 RBs, or 50 RBs. Hereinafter, this point will be described specifically with reference to FIG. 4.

Figure 4:
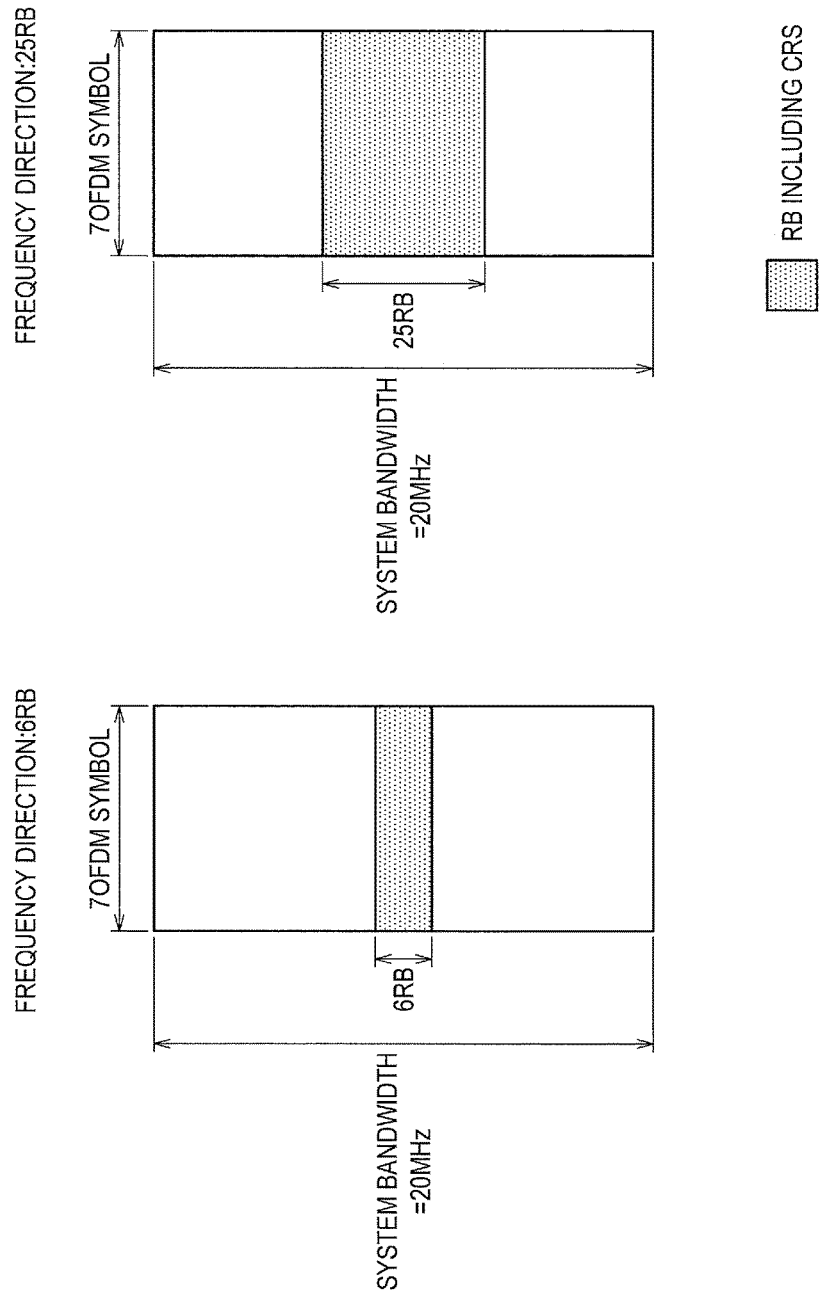
FIG. 4 is an explanatory diagram illustrating an example of a reduction in CRSs in a frequency direction.

FIG. 4 is an explanatory diagram illustrating an example of a reduction in the CRSs in the frequency direction. A case in which the RBs in which the CRSs are transmitted are reduced to 6 RBs in the frequency direction and a case in which the RBs in which the CRSs are transmitted are reduced to 25 RBs in the frequency direction are illustrated in FIG. 4. In this way, not all of the CRSs in the RBs in the frequency direction are transmitted, but the CRSs in a limited number of the RBs are transmitted.

On the other hand, as the reduction in the CRSs in the time direction, for example, a transmission period of the CRSs is considered to be 5 ms or 10 ms. This point will be described specifically with reference to FIG. 5.

Figure 5:
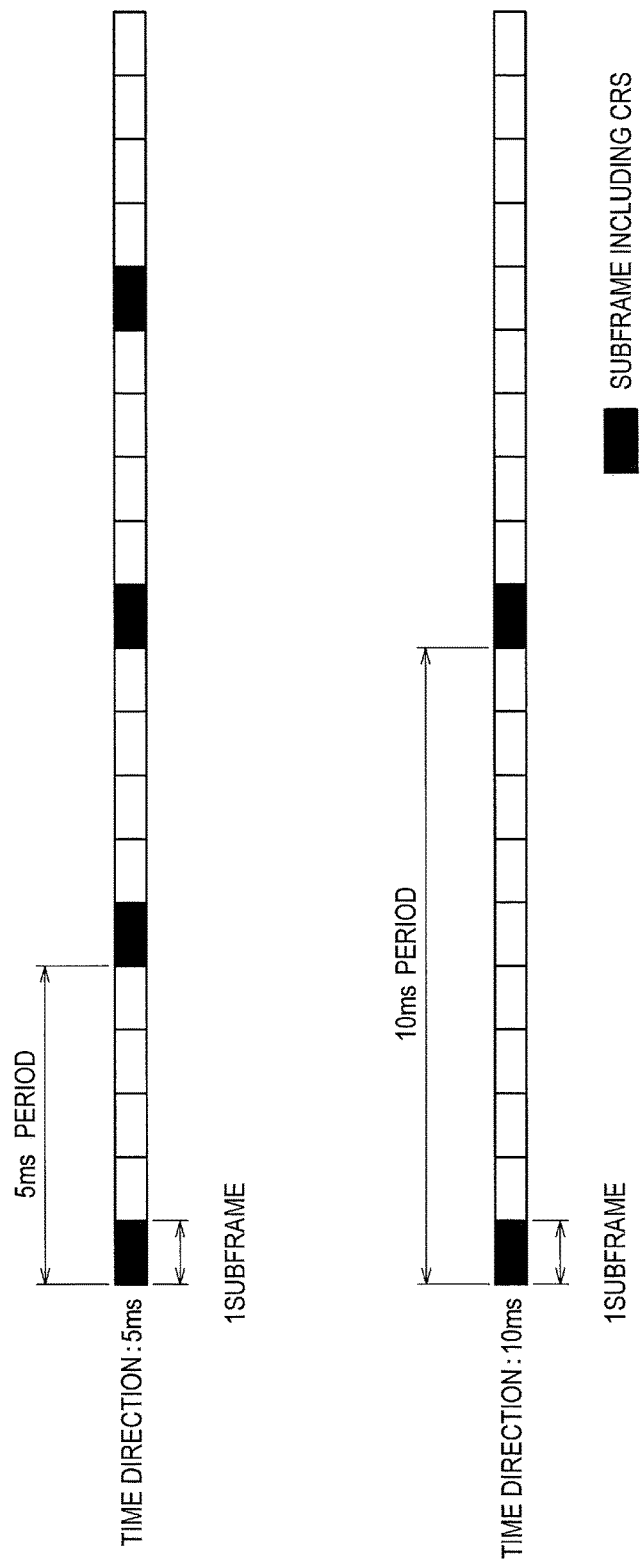
FIG. 5 is an explanatory diagram illustrating an example of a reduction in CRSs in a time direction.

FIG. 5 is an explanatory diagram illustrating an example of a reduction in the CRSs in the time direction. A case in which the transmission period of the CRS is 5 ms and a case in which the transmission period of the CRS is 10 ms are illustrated in FIG. 5. In this way, not all of the CRSs of the slots or the subframes in the time direction are transmitted, but the CRSs in a limited number of the subframes are transmitted.

As described above, a method of combining the reductions in the CRSs in the frequency direction and the reductions in the CRSs in the time direction has been investigated. As an evaluation of whether the UE establishes synchronization, whether accuracy of about 500 Hz is maintained in an environment of an SNR of −8 dB was evaluated. As a result, in the environment of an SNR of −8 dB, it is necessary to transmit the CRS in 25 RBs every 5 ms.

Reduction in CRSs in Synchronized NCT

On the other hand, since the synchronized NCT (SNCT) is synchronized with the legacy CC, the existing CRSs can be basically deleted in the SNCT.

(Synchronization Monitoring Procedure)

The UE monitors whether the UE establishes synchronization based on a block error rate (BLER) of a physical downlink control channel (PDCCH). In other words, the UE detects synchronization deviation of the UE based on the BLER of the PDCCH. For example, when the BLER of the PDCCH is equal to or greater than 10%, the UE detects the synchronization deviation.

When the synchronization deviation is detected a predetermined number of times, a timer starts. Then, when a period of time of the timer expires, radio link failure (RLF) is recognized. When the RLF is recognized, the UE stops all of the transmission within 40 ms from the recognition of the RLF in order to avoid interference with another UE. Thereafter, the UE performs a procedure of RRC reestablishment including cell selection and random access.

The UE performs the above-described synchronization monitoring on the PCC, but does not perform the synchronization monitoring on the SCC. The UE deactivates the SCC when the PDCCH is not detected in the SCC.

(NCT of Release 12)

NCT of Release 12 is a study item (SI) that was approved in September 2012 as RP-121415 at the 3GPP RAN #57 Plenary meeting. This SI is divided into phase 1 and phase 2. In phase 1, enhancement of NCT of Release 11 is scheduled to be investigated. In phase 2, the enhancement is scheduled to be investigated in consideration of scenarios of small cells. Specific examples of small cells include a pico cell, a nano cell, and a femto cell. In the present specification, the description will be made exemplifying a pico cell as the small cell.

As the scenarios of a small cell, three deployment scenarios of a small cell are considered. Such deployment scenarios are printed in TR 36.932, for example. In a first deployment scenario (that is, Deployment Scenario 1), a small cell is entirely overlapping with a macro cell. In a second deployment scenario (that is, Deployment Scenario 2), a small cell is partially overlapping with a macro cell. In a third deployment scenario (that is, Deployment Scenario 3), a small cell is not overlapping with a macro cell. That is, there is no macro cell near the small cell and only the small cell is operated. Hereinafter, specific examples of the deployment scenarios will be described with reference to FIG. 6.

Figure 6:
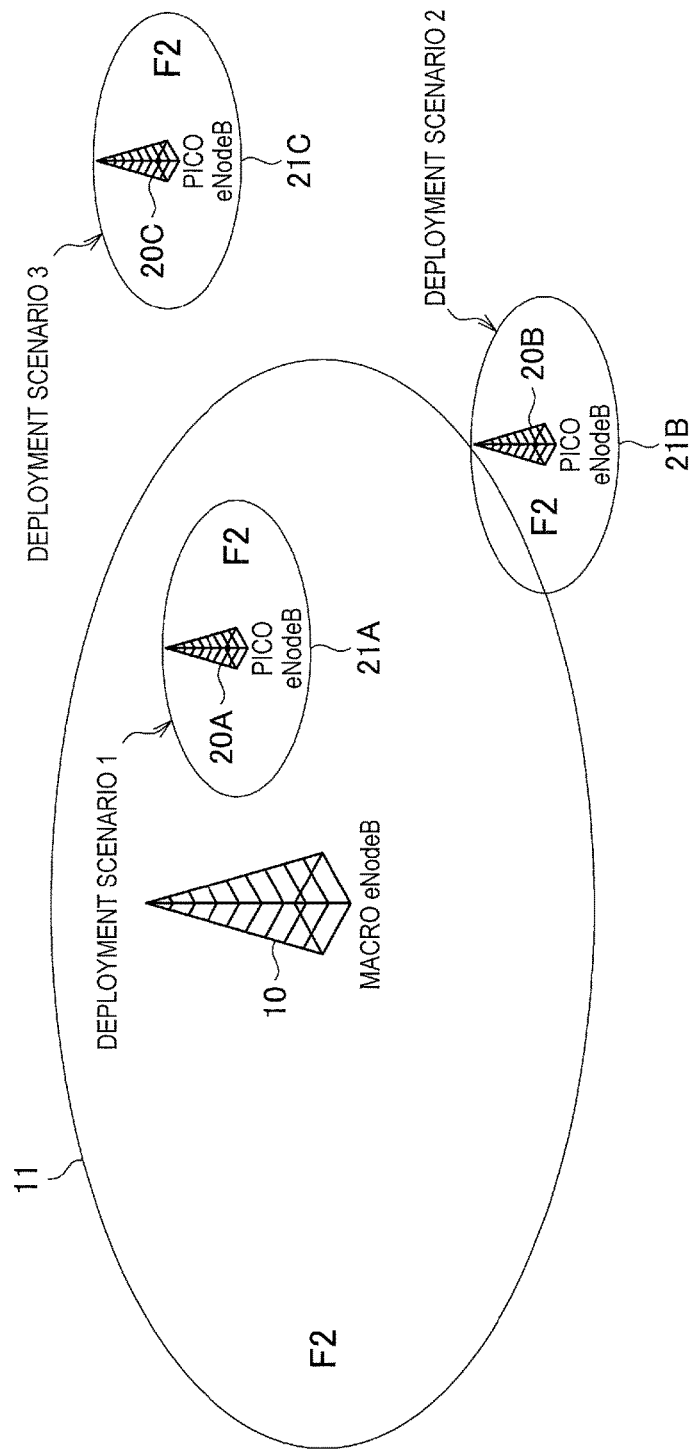
FIG. 6 is an explanatory diagram illustrating examples of three deployment scenarios of a small cell.

FIG. 6 is an explanatory diagram illustrating examples of three deployment scenarios of a small cell. Referring to FIG. 6, a macro cell 11 and three pico cells 21A, 21B, and 21C are illustrated. A macro eNodeB 10 which is a base station of the macro cell 11 and pico eNodeBs 20 which are base stations of the pico cells 21 and are also illustrated. First, the pico cell 21A is entirely overlapping with the macro cell 11, the pico cell 21B is partially overlapping with the macro cell 11, and the pico cell 21C is not overlappig with the macro cell 11. That is, the deployment of the pico cell 21A corresponds to the first deployment scenario, the deployment of the pico cell 21B corresponds to the second deployment scenario, and the deployment of the pico cell 21C corresponds to the third deployment scenario. In the example, radio communication is performed using a frequency band F1 in the macro cell 11. Further, radio communication is performed using a frequency band F2 in the pico cell 21.

(Supply Methods for Control Information to UE)

The eNodeB uses, for example, system information or radio resource control (RRC) signaling when the eNodeB supplies control information to the UE. Hereinafter, characteristics of two supply methods will be described with reference to FIG. 7.

FIG. 7 is an explanatory diagram illustrating characteristics of system information and RRC signaling. Referring to FIG. 7, there are illustrated a UE state necessary for the eNodeB to supply the control information to the UE, a supply target UE (and supplied information), and a suppliable information amount for the system information and the RRC signaling.

First, in order for the eNodeB to supply the control information with the system information, the UE may be in one of RRC_Connected (that is, a connection state) and RRC_Idle (that is, an idle state). On the other hand, in order for the eNodeB to supply the control information with the RRC signaling, the UE has to be in RRC_Connected (that is, the connection state).

Second, the control information is supplied with the system information to all of the UEs rather than an individual UE. That is, the control information supplied with the system information can be said to be information common to the UEs. On the other hand, the control information is basically supplied with the RRC signaling to the individual UE. That is, the control information supplied with the RRC signaling can be said to be basically the control information of the separate UE. However, by transmitting the control information common to other UEs with the RRC signaling, the common information can also be supplied to the UEs with the RRC signaling.

Third, the system information includes restricted control information and is transmitted using restricted radio resources. Therefore, an information amount of control information supplied with the system information is small. On the other hand, the RRC signaling is transmitted with a Physical Downlink Shared CHannel (PDSCH) relatively freely. Therefore, an information amount of control information supplied with the RRC signaling is large.

2. Technical Problems Related to Embodiment of the Present Disclosure

Next, technical problems related to an embodiment of the present disclosure will be described.

2.1 Examination of Synchronization Between Frequency Bands

First, examination of synchronization between frequency bands will be described.

(Synchronization Between Frequency Bands)

Here, the synchronization between frequency bands will be described more specifically. As the synchronization between the frequency bands, there are synchronization in a time direction (hereinafter referred to as "time synchronization") and synchronization in a frequency direction (hereinafter referred to as "frequency synchronization"). Hereinafter, specific examples of this point will be described with reference to FIGS. 8 and 9.

Figure 8:
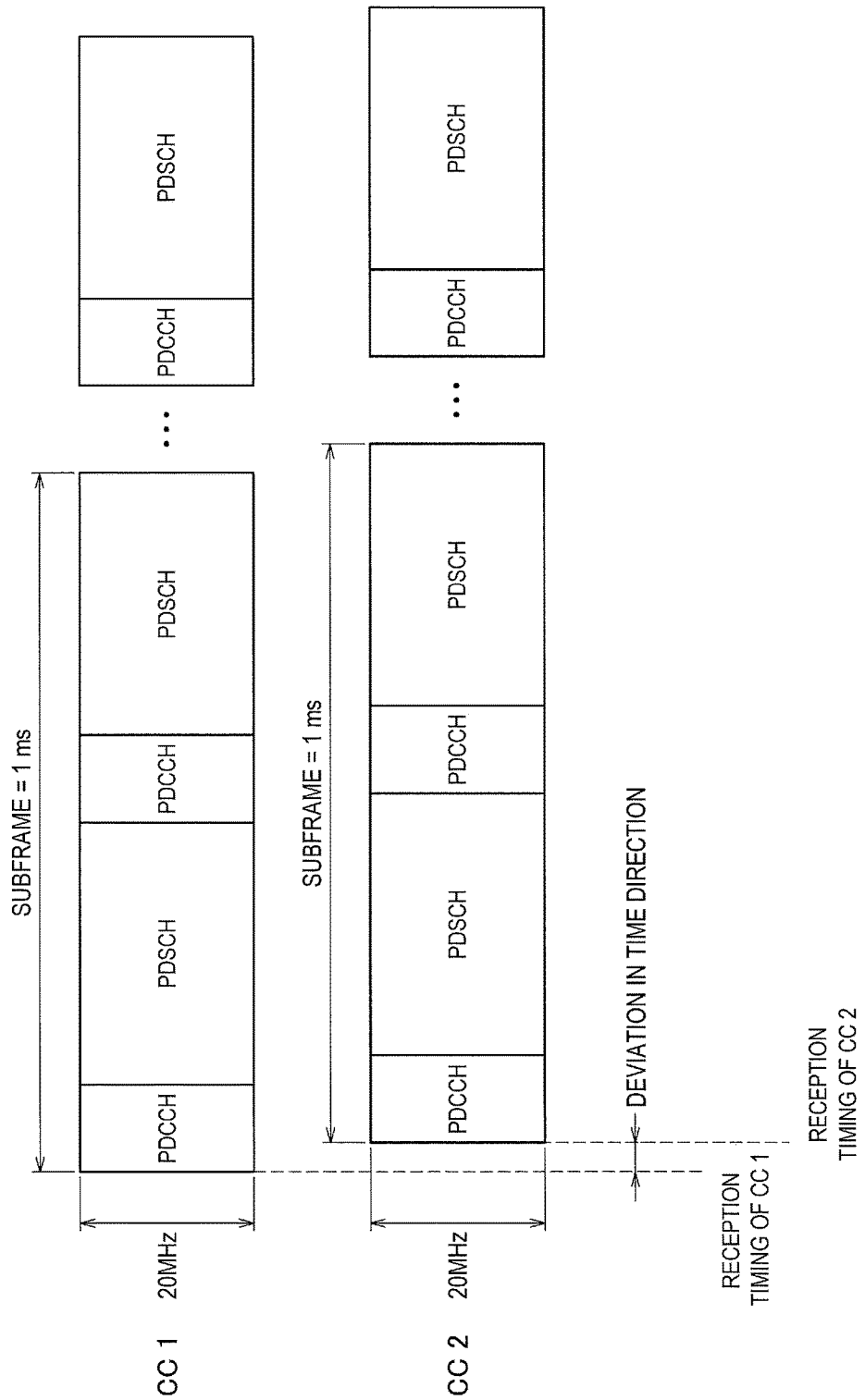
FIG. 8 is an explanatory diagram illustrating time synchronization between component carriers.

FIG. 8 is an explanatory diagram illustrating the time synchronization between component carriers. Referring to FIG. 8, there are illustrated reception timings of the CC 1 and the CC 2. For example, as in the example illustrated in FIG. 8, deviation can occur in the time direction between the reception timing of a signal with the CC 1 in the UE and the reception timing with the CC 2 in the UE. For example, when the deviation in the time direction is less than a guard interval length of the OFDM, the CC 1 and the CC 2 can be considered to be mutually synchronized in the time direction.

Figure 9:
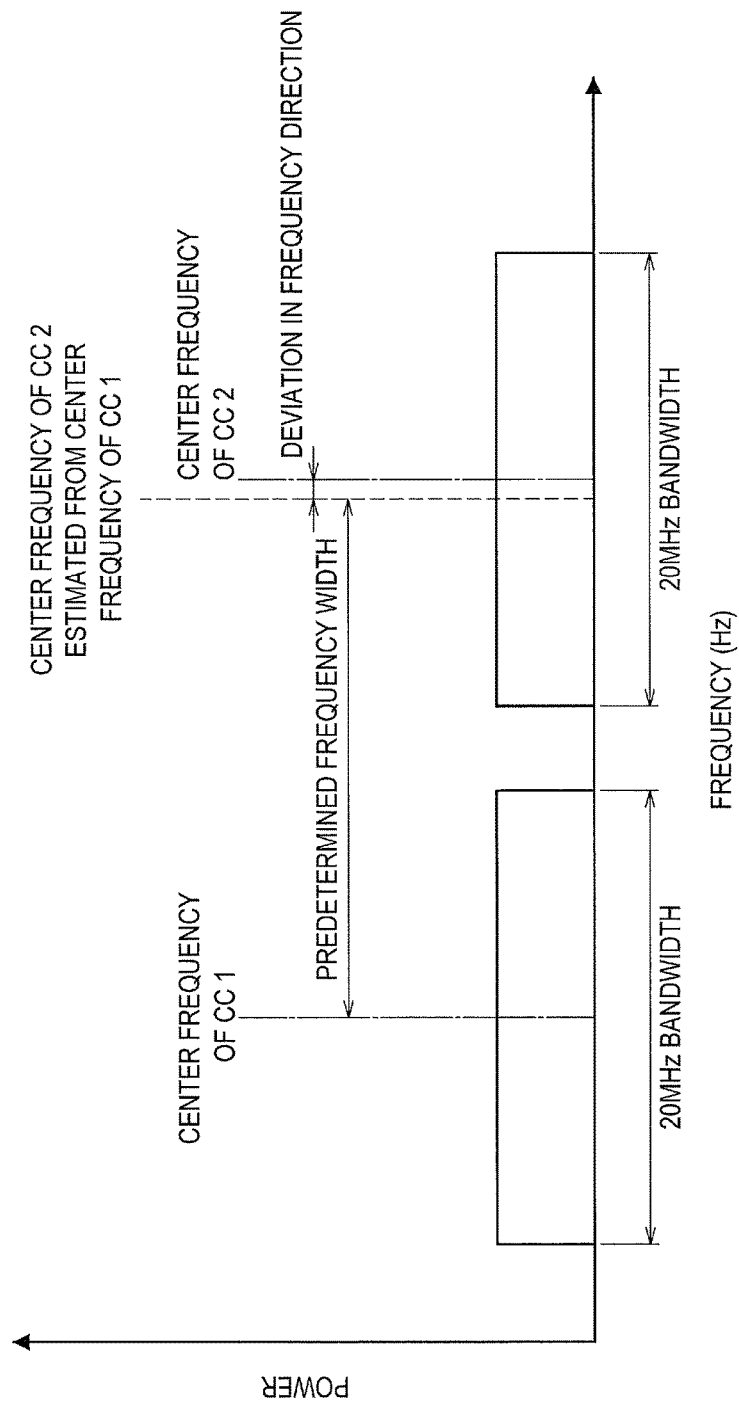
FIG. 9 is an explanatory diagram illustrating frequency synchronization between component carriers.

FIG. 9 is an explanatory diagram illustrating frequency synchronization between component carriers. Referring to FIG. 9, there are illustrated the frequency band of the CC 1 and the frequency band of the CC 2. A center frequency of the CC 1 and a center frequency of the CC 2 are also illustrated. The center frequency of the CC 1 is separated from the center frequency of the CC 2 by a predetermined frequency width. However, in practice, for example, deviation can occur in the frequency direction between the center frequency of the CC 2 and a frequency separated from the center frequency of the CC 1 by the predetermined frequency width. For example, when the deviation in the frequency direction is within a predetermined frequency width (for example, 500 Hz in Long Term Evolution (LTE)), the CC 1 and the CC 2 can be considered to be mutually synchronized in the frequency direction.

As described above, the synchronization between the frequency bands includes the time synchronization and the frequency synchronization. Therefore, there are the following four cases of the synchronization between the frequency bands:

Case 1: both the time synchronization and the frequency synchronization are achieved;

Case 2: the time synchronization is achieved, but the frequency synchronization is not achieved;

Case 3: the time synchronization is not achieved, but the frequency synchronization is achieved; and Case 4: neither the time synchronization nor the frequency synchronization is achieved.

In general, the mutually synchronized frequency bands are the frequency bands corresponding to Case 1. However, the frequency bands corresponding to Case 2 or Case 3 may be considered to be the mutually synchronized frequency bands (in the time direction or the frequency direction).

(Synchronization on eNodeB Side and Synchronization on UE Side)

From a different viewpoint, as the synchronization between the frequency bands, there are synchronization on an eNodeB side (that is, a network side) and synchronization in a UE. Further, even when the time synchronization and the frequency synchronization are achieved for two CCs on the eNodeB side, it is not clear that the time synchronization and the frequency synchronization are achieved on the UE side when the UE receives signals in the two CCs.

For example, when the CC 1 and the CC 2 are separated in the frequency direction, a propagation path of the CC 1 and a propagation path of the CC 2 are different. As a result, arrival times of the signals may be different. In this case, the time synchronization is not achieved.

For example, a radio wave of the CC 1 and a radio wave of the CC 2 can arrive at the UE from different directions. In this case, when the UE moves in the arrival direction of the radio wave of the CC 1, the frequency of the CC 1 transitions from a frequency f to a frequency f+Δf due to the Doppler effect. Further, when the UE moves in a direction opposite to the arrival direction of the radio wave of the CC 2, the frequency band of the CC 2 transitions from a frequency f to a frequency f−Δf due to the Doppler effect. In this way, the frequency synchronization is not achieved due to the Doppler effect.

As described above, since the time synchronization and the frequency synchronization might not be achieved, it is not clear that the two CCs are mutually synchronized on the UE side even if the two CCs are synchronized on the network side.

2.2 Technical Problems

Next, technical problems will be described.

Utilization of Synchronization Result

In Release 11 of 3GPP, as described above, NCTs have been investigated as new component carriers apart from legacy CCs (existing CCs) capable of maintaining backward compatibility. Here, the NCTs are assumed to be new types of CCs and the CCs of the types. Further, an NCT (that is, SNCT) synchronized with the legacy CC and an NCT (that is, UNCT) not synchronized with the legacy LCC have been investigated as the NCTs.

Because the SNCT is synchronized with any legacy CC, when a UE establishes synchronization in one CC between the mutually synchronized SNCT and legacy CC, a synchronization result of the UE in the one CC can be utilized for the other CC. That is, the UE does not have to establish separate synchronization with a synchronization signal in the other CC.

The UNCT is not synchronized with any legacy CC, but can be synchronized with different UNCTs. When the UE establishes synchronization in one CC among two or more mutually synchronized UNCTs, a synchronization result of the UE in the one CC can be utilized for the different CCs.

That is, the UE does not have to establish separate synchronization with a synchronization signal in the other CCs.

Consumption of Resources in Macro eNodeB Due to Use of Synchronization Result

However, for example, in a case where there are a macro cell and one or more small cells that are partially or entirely overlapping with the macro cell, a large number of UEs located within the macro cell can establish synchronization in a CC of the macro cell by a synchronization signal, and can establish synchronization by utilizing the synchronization result in a CC of the small cell(s). Thus, it is assumed that the large number of UEs are in RRC_Connected in the CC of the macro cell. As a result, a large number of resources (such as memory resources for holding data addressed to the large number of UEs and radio resources for signaling to the large number of UEs) in an eNodeB of the macro cell can be consumed.

Accordingly, according to an embodiment of the present disclosure, it becomes possible to suppress the consumption of resources in a base station of a macro cell in a case where a terminal device uses a frequency band of the macro cell in order to utilize a synchronization result.

3. Schematic Configuration of Communication System According to the Present Embodiment Next, a schematic configuration of a communication system according to an embodiment of the present disclosure will be described with reference to FIG. 10.

Figure 10:
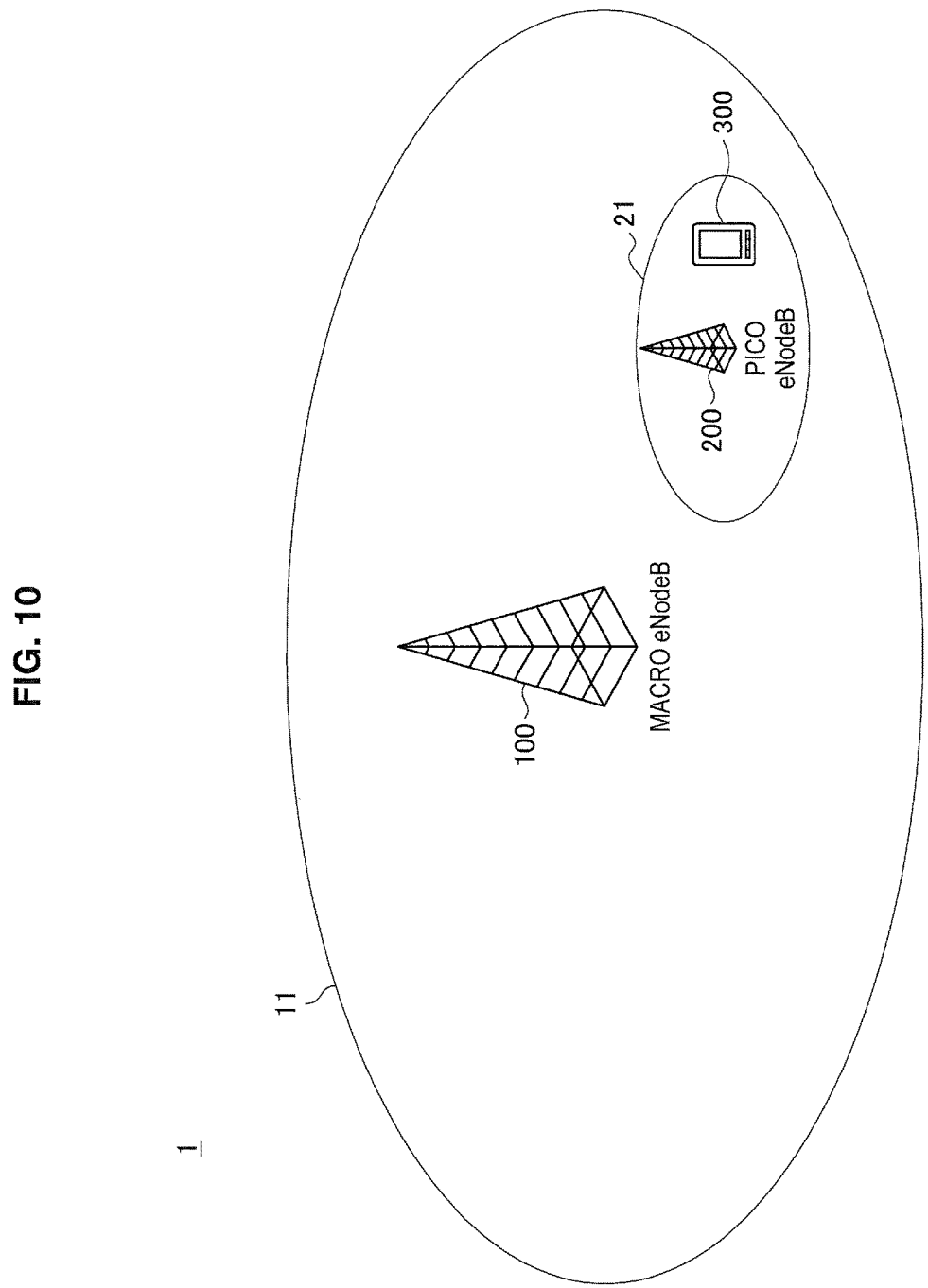
FIG. 10 is an explanatory diagram illustrating an example of a schematic configuration of a communication system according to an embodiment of the present disclosure.

FIG. 10 is an explanatory diagram illustrating an example of the schematic configuration of a communication system 1 according to an embodiment of the present disclosure. Referring to FIG. 10, the communication system 1 includes a macro eNodeB 100, a pico eNodeB 200, and a UE 300. For example, the communication system 1 is a system that conforms to LTE-Advanced.

(Macro eNodeB 100)

The macro eNodeB 100 performs radio communication with the UE 300 located within the macro cell 11. In addition, the macro eNodeB 100 performs radio communication using one or more component carriers (CCs).

For example, each of the one or more CCs used by the macro eNodeB 100 is different from any of the one or more CCs used in the pico cell 21.

Furthermore, for example, the macro eNodeB 100 performs radio communication using a plurality of CCs. The macro eNodeB 100 can use the plurality of CCs at the same time for radio communication with one UE 300. That is, the macro eNodeB 100 supports carrier aggregation.

(Pico eNodeB 200)

The pico eNodeB 200 performs radio communication with the UE 300 located within the pico cell 21 that is partially or entirely overlapping with the macro cell 11. The pico eNodeB 200 performs the radio communication using one or more CCs.

For example, each of the one or more CCs used by the pico eNodeB 200 is different from any of the one or more CCs used in a macro cell cell 11.

Furthermore, for example, the pico eNodeB 200 performs radio communication using a plurality of CCs. The pico eNodeB 200 can use the plurality of CCs at the same time for radio communication with one UE 300. That is, the pico eNodeB 200 supports carrier aggregation.

In particular, in an embodiment of the present disclosure, a first CC (hereinafter referred to as "CC 1") used for radio communication in the macro cell 11 is synchronized with a second CC (hereinafter referred to as "CC 2") used for radio communication in the pico cell 21. For example, the CC 1 is one of the one or more CCs used by the macro eNodeB 100, and the CC 2 is one of the one or more CCs used by the pico eNodeB 200. In addition, for example, the CC 1 and the CC 2 are mutually synchronized in both the time direction and the frequency direction.

Note that, in the present embodiment, the pico cell 21 is deployed as in a first deployment scenario (that is, Deployment Scenario 1) or a second deployment scenario (that is, Deployment Scenario 2).

(UE 300)

The UE 300 performs radio communication with the macro eNodeB 100 within the macro cell 11. In addition, the UE 300 performs radio communication with the pico eNodeB 200 within the pico cell 21.

Furthermore, the UE 300 can perform radio communication using a plurality of CCs at the same time. Specifically, for example, the UE 300 may use the plurality of CCs at the same time to perform the radio communication with the macro eNodeB 100 and/or the pico eNodeB 200. That is, the UE 300 supports carrier aggregation.

4. First Embodiment

Next, a first embodiment of the present disclosure will be described with reference to FIG. 11 to FIG. 21. According to the first embodiment of the present disclosure, by control of the macro eNodeB 100, it is possible to suppress the consumption of resources in the macro eNodeB 100.

4.1. Configuration of Macro eNodeB

Figure 11:
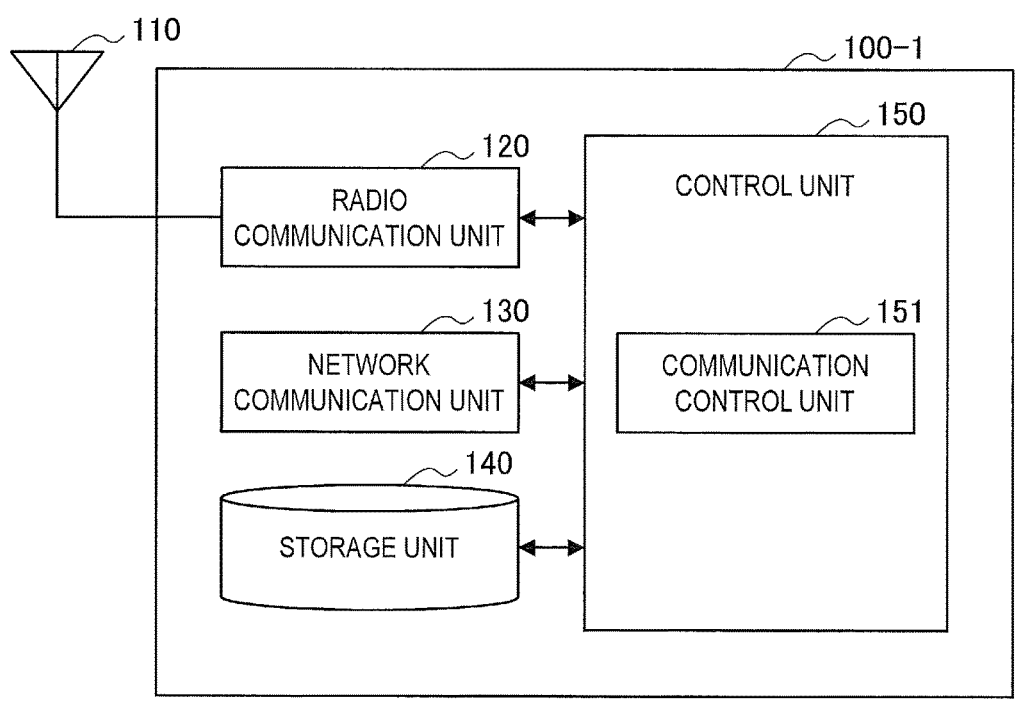
FIG. 11 is a block diagram illustrating an example of a configuration of a macro eNodeB according to a first embodiment.

First, the configuration of a macro eNodeB 100-1 according to the first embodiment will be described with reference to FIG. 11 to FIG. 14. FIG. 11 is a block diagram illustrating an example of the configuration of the macro eNodeB 100-1 according to the first embodiment. Referring to FIG. 11, there is shown the macro eNodeB 100-1 including an antenna unit 110, a radio communication unit 120, a network communication unit 130, a storage unit 140, and a control unit 150.

(Antenna Unit 110)

The antenna unit 110 receives a radio signal and outputs the received radio signal to the radio communication unit 120. In addition, the antenna unit 110 transmits a transmission signal output by the radio communication unit 120.

(Radio Communication Unit 120)

The radio communication unit 120 performs radio communication with a UE 300-1 located within the macro cell 11. For example, the radio communication unit 120 performs radio communication using one or more CCs at the same time.

For example, the one or more CCs are different from any of the one or more CCs used for the radio communication in the pico cell 21.

Furthermore, for example, the radio communication unit 120 performs radio communication using a plurality of CCs. The radio communication unit 120 can perform radio communication with one UE 300-1 using the plurality of CCs at the same time. That is, the macro eNodeB 100 supports carrier aggregation.

In particular, in an embodiment of the present disclosure, as described above, the first CC (that is, the CC 1) used for the radio communication in the macro cell 11 is synchronized with the second CC (that is, the CC 2) used for the radio communication in the pico cell 21. For example, the CC 1 is one of the one or more CCs used by the macro eNodeB 100, and the CC 2 is one of the one or more CCs used by the pico eNodeB 200. In addition, for example, the CC 1 and the CC 2 are mutually synchronized in both the time direction and the frequency direction.

(Network Communication Unit 130)

The network communication unit 130 communicates with another communication node. For example, the network communication unit 130 communicates with the pico eNodeB 200, another macro eNodeB 100-1, a Mobility Management Entity (MME), or the like.

(Storage Unit 140)

The storage unit 140 stores a program and data for an operation of the macro eNodeB 100-1.

(Control Unit 150)

The control unit 150 provides a variety of functions of the macro eNodeB 100-1.

The control unit 150 includes a communication control unit 151.

(Communication Control Unit 151)

The communication control unit 151 controls the radio communication in the macro cell 11 overlapping with part or whole of the pico cell 21.

Control of Connection in CC 1

As described above, the CC 1 used for the radio communication in the macro cell 11 is synchronized with the CC 2 used for the radio communication in the pico cell 21. In addition, in the CC 1, a synchronization signal for synchronization in the CC 1 is transmitted. For example, the synchronization signal is a common reference signal (CRS). In this case, for example, the communication control unit 151 controls the transmission of the CRS in the CC 1. More specifically, for example, the communication control unit 151 inserts the CRS in a downlink signal transmitted in the CC 1.

Content of Control

In particular, in the first embodiment, the communication control unit 151 does not allow the UE 300-1 satisfying certain conditions (hereinafter referred to as "connection barring conditions") to be connected in a radio resource in the CC 1. The connection barring conditions include synchronization of the UE 300-1 in the CC 2 by utilizing the synchronization result by the synchronization signal.

Specifically, for example, the connection barring conditions include synchronization of the UE 300-1 in the CC 2 of the pico cell 21 by utilizing the synchronization result by the CRS in the CC 1 in the macro cell 11. That is, the communication control unit 151 does not allow some or all of the UEs 300-1 that establish synchronization in the CC 2 by utilizing the synchronization result in the CC 1 to be in RRC_Connected in the CC 1. An example of the operation of the UE 300-1 satisfying the connection barring conditions will be described below with reference to FIG. 12.

Figure 12:
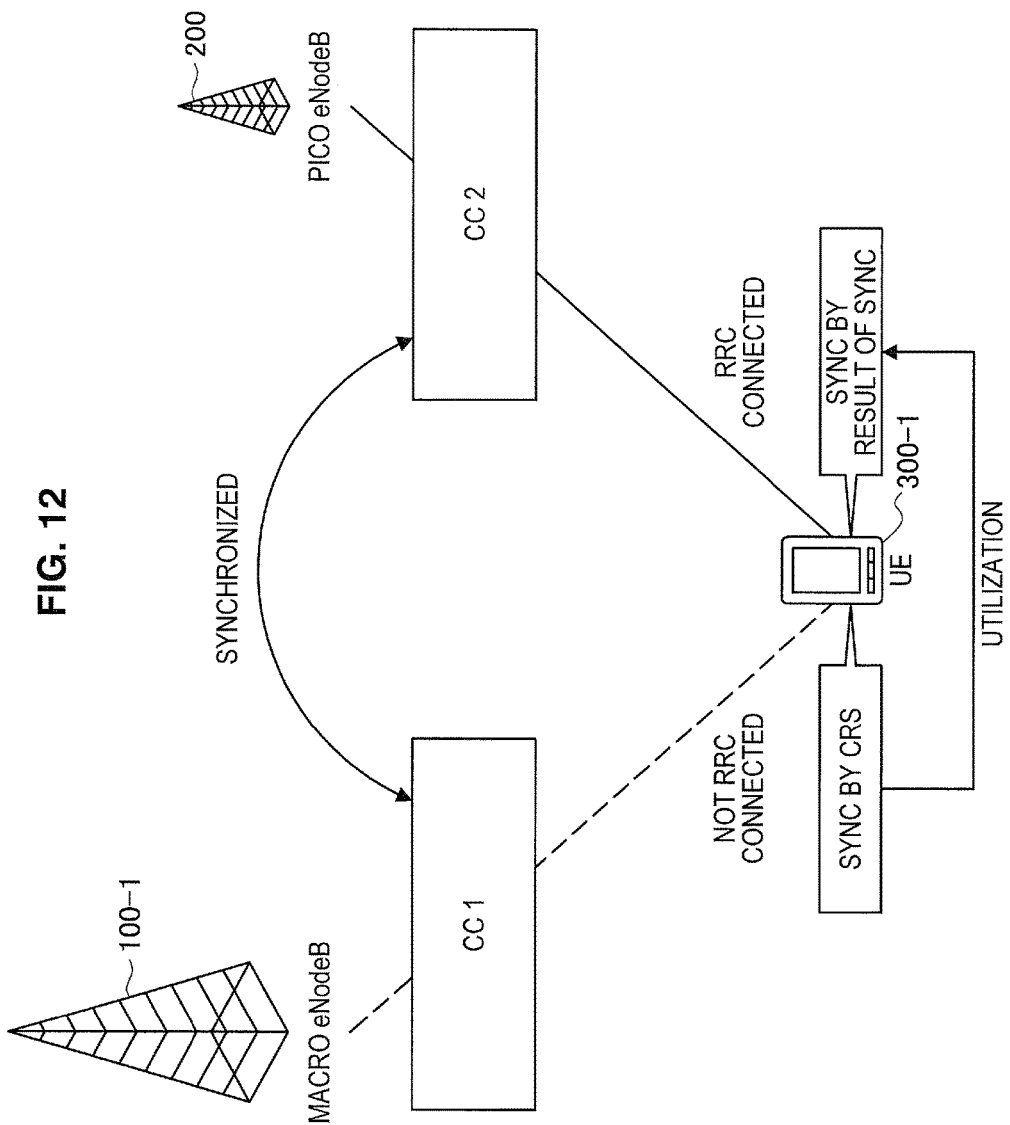
FIG. 12 is an explanatory diagram illustrating an example of an operation of a UE satisfying connection barring conditions.

FIG. 12 is an explanatory diagram illustrating the example of the operation of the UE 300-1 satisfying the connection barring conditions. Referring to FIG. 12, there are illustrated the CC 1 used by the macro eNodeB 100-1, the CC 2 used by the pico eNodeB 200, and the UE 300-1. As described above, the CC 1 and the CC 2 are mutually synchronized. In addition, the UE 300-1 is in RRC_Connected in the CC 2 of the pico cell 21. In this example, since the UE 300-1 satisfies the connection barring conditions, the UE 300-1 does not enter RRC_Connected in the CC 1 of the macro cell 11. However, the UE 300-1 establishes synchronization by the CRS in the CC 1 of the macro cell 11. Further, the UE 300-1 establishes synchronization in the CC 2 of the pico cell 21 by utilizing the synchronization result by the CRS in the CC 1.

In addition, for example, the connection barring conditions further include no data transmission and reception by the UE 300 using the CC 1.

Specifically, for example, the connection barring conditions include no data transmission and reception by the UE 300 using the CC 1 of the macro cell 11 but establishes synchronization in the CC 2 of the pico cell 21 by utilizing the synchronization result by the CRS in the CC 1 of the macro cell 11. That is, the communication control unit 151 does not allow some or all of the UE 300s that do not transmit and receive data using the CC 1, among the UE 300s that establish synchronization in the CC 2 by utilizing the synchronization result in the CC 1, to enter RRC_Connected in the CC 1.

Specific Control Method

As an example of a specific method, the communication control unit 151 notifies the UE 300 of the barring of connection of the device satisfying the connection barring conditions in the CC 1 so as to not allow the UE 300 to be connected in a radio resource in the CC 1. More specifically, for example, the communication control unit 151 notifies the UE 300 of the barring of connection using system information supplied in the CC 1.

For example, system information about the CC 1 includes access barring information indicating the barring of connection of the device satisfying the connection barring conditions in the CC 1. In addition, the communication control unit 151 acquires the system information including the access barring information, and supplies the system information in the CC 1 through the radio communication unit 120. On the other hand, the UE 300-1 establishes synchronization by a synchronization signal such as a primary synchronization signal (PSS) or a secondary synchronization signal (SSS) (and the synchronization signal such as the CRS) in the CC 1, and then acquires the system information about the CC 1. Further, the UE 300-1 confirms that the system information includes the access barring information. Then, the UE 300-1 determines whether the UE 300-1 satisfies the connection barring conditions. When the connection barring conditions are satisfied, the UE 300-1 does not perform a connection procedure to enter RRC_Connected in the CC 1. For example, the connection procedure is a random access procedure including the transmission of a random access preamble in a random access channel (RACH).

Advantages of Control

As described above, some or all of the UEs 300-1 that establish synchronization in the CC 2 of the pico cell 21 by utilizing the synchronization result by the CRS in the CC 1 of the macro cell 11 do not enter RRC_Connected in the CC 1. As a result, in a case where the CC 1 of the macro cell 11 is used by the UE 300-1 for utilizing the synchronization result, it is possible to suppress the consumption of resources in the macro eNodeB 100.

More specifically, a large number of the UEs 300-1 can exist within the macro cell 11, and the large number of UEs 300-1 can utilize the synchronization result in the CC 1 of the macro cell 11 for synchronization in the CC 2 of the pico cell 21. In this case, if the large number of UEs 300-1 enter RRC_Connected in the CC 1, a large number of resources can be consumed in the macro eNodeB 100. For example, in the macro eNodeB 100-1, memory resources for holding data addressed to the large number of UEs 300-1, radio resources for signaling to the large number of UEs 300-1, and process resources for signaling to the large number of UEs 300-1 can be consumed.

Accordingly, by preventing some or all of the UEs 300-1 that utilize the synchronization result in the CC 1 for synchronization in the CC 2 of the pico cell 21 from entering RRC_Connected in the CC 1, it becomes possible to suppress the consumption of resources in the macro eNodeB 100-1. For example, it is possible to suppress the consumption of the memory resources in the macro eNodeB 100, the radio resources used by the macro eNodeB 100, the process resources in the macro eNodeB 100-1, and the like.

Further, as described above, it is not that the UE 300-1 does not enter RRC_Connected spontaneously, but that the macro eNodeB 100-1 does not allow the UE 300-1 to enter RRC_Connected. Thus, it is also possible to not allow the UE 300-1 to enter RRC_Connected selectively on the network side (the macro eNodeB 100-1 side). As an example, in a case where a large number of the pico cells 21 are deployed within the macro cell 11, the macro eNodeB 100-1 does not allow the UE 300 satisfying the connection barring conditions to be connected; in a case where only a small number of the pico cells 21 are deployed within the macro cell 11, the macro eNodeB 100-1 may allow even the UE 300 satisfying the connection barring conditions to be connected.

Furthermore, as described above, among the UEs 300-1 that establish synchronization in the CC 2 of the pico cell 21 by utilizing the synchronization result by the CRS in the CC 1 of the macro cell 11, some or all of the UEs 300-1 that do not transmit and receive data using the CC 1 do not enter RRC_Connected in the CC 1. As a result, it becomes possible to suppress the consumption of resources in the macro eNodeB 100-1, and it also becomes possible that the UE 300-1 can transmit and receive data using the CC 1 of the macro cell 11 more freely.

More specifically, when all of the UEs 300-1 that utilize the synchronization result in the CC 1 for synchronization in the CC 2 are not allowed to enter RRC_Connected, the transmission and reception of data by the UE 300-1 using the CC 1 can be considerably restricted. For example, in a case where the synchronization result in the CC 1 is utilized for synchronization in the CC 2, the UE 300-1 cannot transmit and receive data using the CC 1. Further, from another viewpoint, except under the condition that the synchronization result in the CC 1 is not utilized for synchronization in the CC 2, the UE 300-1 cannot transmit and receive data using the CC 1.

Accordingly, among the UEs 300-1 that utilize the synchronization result in the CC 1, in particular, the UE 300-1 that does not transmit and receive data using the CC 1 is not allowed to enter RRC_Connected in the CC 1, thereby enabling the UE 300-1 to transmit and receive data using the CC 1 of the macro cell 11 more freely. That is, the UE 300-1 can transmit and receive data using the CC 1 while utilizing the synchronization result in the CC 1. Further, since the UE 300-1 that does not transmit and receive data using the CC 1 does not enter RRC_Connected in the CC 1, it is possible to suppress the consumption of process resources in the macro eNodeB 100 and the like.

Furthermore, as described above, as an example of the specific method, the UE 300-1 is notified of the barring of connection of the device satisfying the connection barring conditions in the CC 1. Thus, the UE 300-1 satisfying the connection barring conditions can be prevented in advance from entering RRC_Connected in the CC 1. That is, it is possible to prevent the UE 300-1 from entering RRC_Connected in advance in the CC 1 instead of restoring the UE 300-1 that has entered RRC_Connected in the CC 1 to RRC_IDLE. Accordingly, it is possible to suppress the generation of useless communication and processing related to the connection procedure.

The barring of the connection is notified using the system information supplied in the CC 1. As a result, it becomes possible to notify the UE 300-1 that does not enter RRC_Connected.

Characteristics of CC 1 and CC 2

For example, the CC 2 is a CC in which, in at least any one of subframes which are time units in radio communication, the synchronization signal is not transmitted. Specifically, the CC 2 is, for example, a CC in which, in at least any one of subframes, the CRS is not transmitted. That is, the CC 2 is a NCT.

Furthermore, for example, the number of synchronization signals transmitted in the CC 2 is smaller than the number of synchronization signals transmitted in the CC 1. Specifically, for example, the number of CRSs transmitted in the CC 2 is smaller than the number of CRSs transmitted in the CC 1.

In such a case, the UE 300-1 can establish synchronization in the CC 2 by utilizing the synchronization result by the CRS in the CC 1, instead of establishing synchronization by the CRS in the CC 2, and thus the synchronization can be established with higher precision in the CC 2.

Furthermore, for example, the number of synchronization signals transmitted in the CC 2 is smaller than the number of synchronization signals required for synchronization in the CC 2. Specifically, for example, the number of CRSs transmitted in the CC 2 is smaller than the number of CRSs required for synchronization in the CC 2. That is, the UE 300-1 cannot establish synchronization by the CRS in the CC 2.

In such a case, although the UE 300-1 cannot establish synchronization individually by the CRS in the CC 2, the UE 300-1 can establish synchronization in the CC 2 by utilizing the synchronization result by the CRS in the CC 1.

Note that the CC 1 and the CC 2 may be an SNCT synchronized with the legacy CC or an UNCT synchronized with each other. Alternatively, the CC 1 and the CC 2 may be legacy CCs synchronized with each other.

Supply of System Information about CC 2

The communication control unit 151 supplies system information in the CC 1. For example, the system information supplied in the CC 1 includes system information about the CC 1.

In addition, for example, the system information supplied in the CC 1 does not include system information about the CC 2. That is, the system information about the CC 2 of the pico cell 21 is not supplied in the CC 1 of the macro cell 11. A specific example regarding this point will be shown with reference to FIG. 13.

Figure 13:
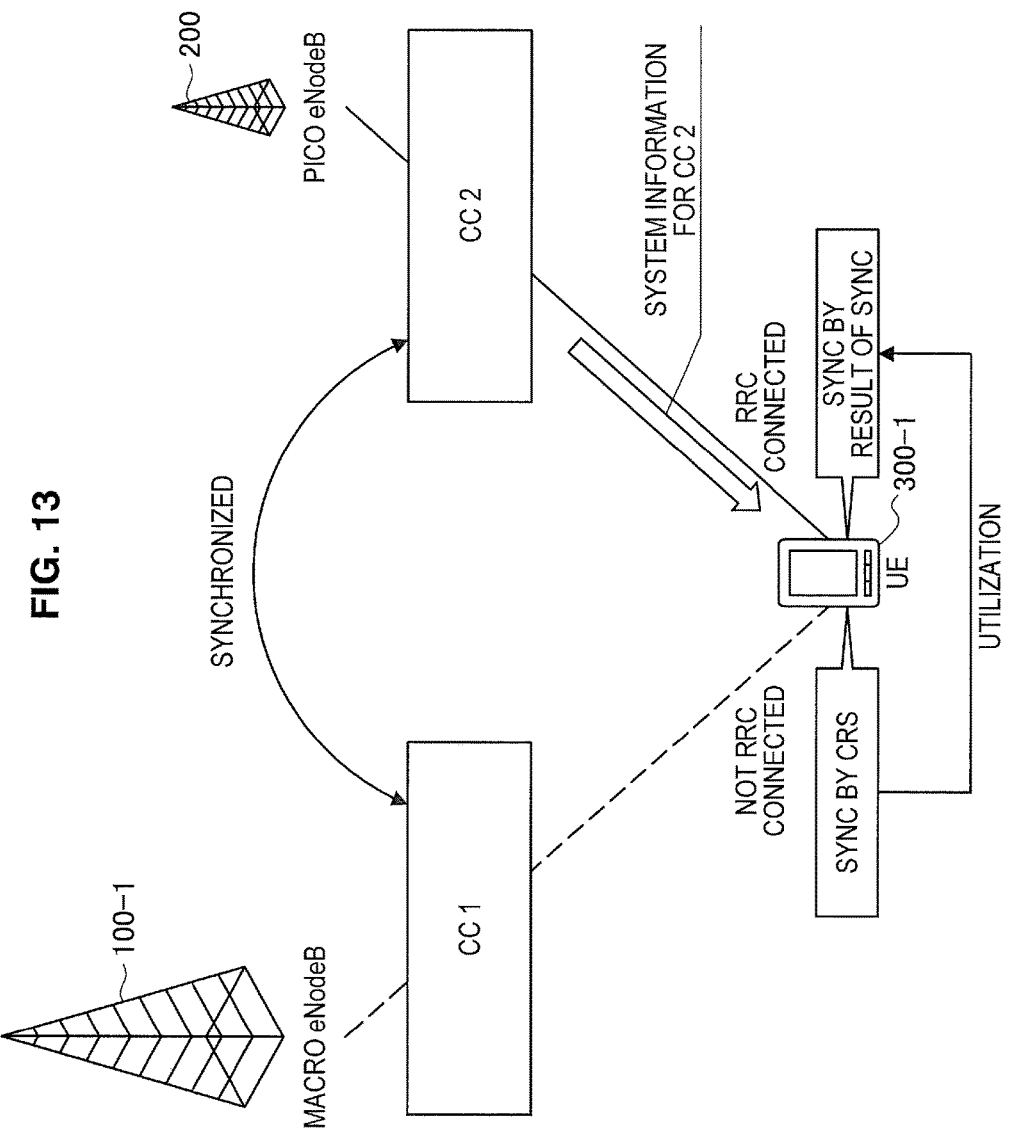
FIG. 13 is an explanatory diagram for illustrating a first example of a route of supplying system information about a CC used for radio communication in a pico cell.

FIG. 13 is an explanatory diagram for illustrating a first example of a route of supplying system information about the CC used for the radio communication in the pico cell 21. Referring to FIG. 13, there are shown, as in FIG. 12, the CC 1 used by the macro eNodeB 100-1, the CC 2 used by the pico eNodeB 200, and the UE 300-1. In addition, since the UE 300-1 satisfies the connection barring conditions, the UE 300-1 does not enter RRC_Connected in the CC 1 of the macro cell 11. In addition, the UE 300-1 establishes synchronization in the CC 2 of the pico cell 21 by utilizing the synchronization result by the CRS in the CC 1. In the example of FIG. 13, in particular, the system information about the CC 2 of the pico cell 21 is not supplied in the CC 1 of the macro cell 11 by the macro eNodeB 100-1. In this example, the system information about the CC 2 is supplied in the CC 2 by the pico eNodeB 200.

In this manner, since the system information about the CC 2 of the pico cell 21 is not supplied in the CC 1 of the macro cell 11, it becomes possible to further suppress the consumption of resources in the macro eNodeB 100. For example, it is possible to suppress the consumption of memory resources, radio resources (such as radio resources for system information), process resources, and the like, required to supply the system information about the CC 2. In particular, since a large number of the pico cells 21 can exist within the macro cell 11, it is possible to significantly suppress the consumption of resources.

Supply of Information Regarding MBMS

Furthermore, for example, the communication control unit 151 supplies information (hereinafter referred to as "MBMS information") regarding multimedia broadcast and multicast service (MBMS) in the CC 1 of the macro cell 11 to the pico eNodeB 200. Then, the MBMS information is supplied by the pico eNodeB 200 to the UE 300-1.

First, as a premise, the MBMS is a broadcast communication service. Any of subframes is set to a MBMS subframe for MBMS. An example of the MBMS subframe will be described below with reference to FIG. 14.

Figure 14:
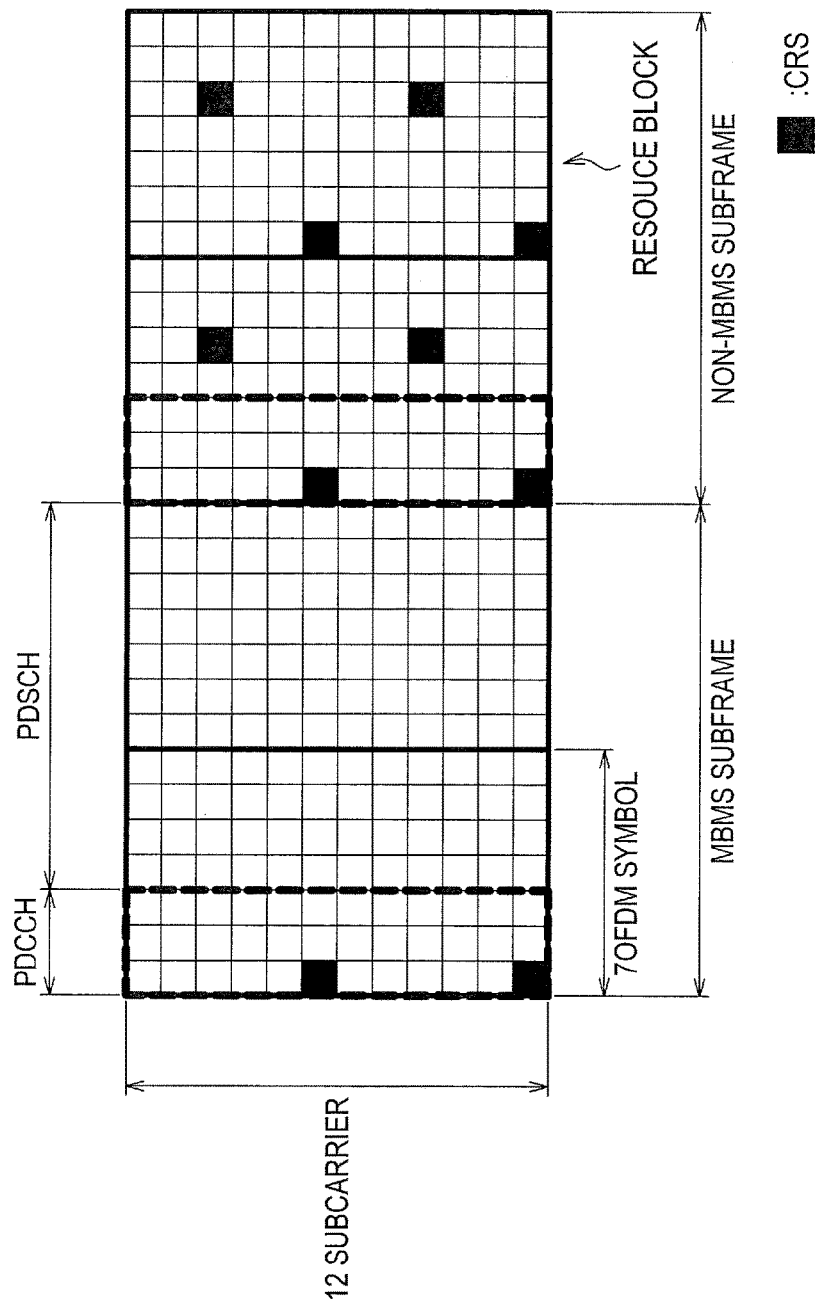
FIG. 14 is an explanatory diagram illustrating an example of an MBMS subframe.

FIG. 14 is an explanatory diagram illustrating the example of the MBMS subframe. Referring to FIG. 14, there are shown four resource blocks in which two subframes are adjacent to each other in the time direction. First, a first subframe is the MBMS subframe, and a second subframe subsequent to the first subframe is not an MBMS subframe but is a normal subframe. As shown in this example, in the MBMS subframe, CRSs are inserted to regions each corresponding to PDCCH, but are not inserted to regions each corresponding to PDSCH.

As described above, in the MBMS subframe, CRS are not inserted to positions to which CRSs are supposed to be inserted in normal subframes. Thus, in a case where the UE 300-1 does not comprehend which subframe is the MBMS subframe in the CC 1, the UE 300-1 cannot establish synchronization considering the positions of the CRSs in the MBMS subframe. As a result, the precision of synchronization can be reduced. Accordingly, it is desirable for the UE 300-1 to comprehend, in advance, which subframe is the MBMS subframe in the CC 1. Information indicating which subframe is the MBMS subframe in the CC 1 is included in the system information about the CC 1.

However, keeping acquiring the system information about the CC 1 places a heavy load on the UE 300-1 in order only to determine which subframe is the MBMS subframe in the CC 1.

Accordingly, as described above, the communication control unit 151 supplies the MBMS information about the CC 1 of the macro cell 11 to the pico eNodeB 200. Then, then, the MBMS information is supplied by the pico eNodeB 200 to the UE 300-1 using the system information or the RRC signaling. Note that the MBMS information indicates, for example, at least which subframe is the MBMS subframe in the CC 1.

More specifically, for example, the UE 300-1 first acquires the MBMS information from the system information supplied by the macro eNodeB 100 in the CC 1, and then establishes synchronization in the CC 1 on the basis of the MBMS information. Then, the UE 300-1 establishes synchronization in the CC 2 by utilizing the synchronization result in the CC 1. After that, when the MBMS information about the CC 1 of the macro cell 11 is changed, the communication control unit 151 of the macro eNodeB 100-1 supplies the MBMS information to the pico eNodeB 200 through the network communication unit 130. Then, the pico eNodeB 200 supplies the MBMS information to the UE 300-1. Next, the UE 300-1 establishes synchronization in the CC 1 on the basis of the MBMS information that has been acquired via the pico eNodeB 200.

In the above manner, the MBMS information is supplied to the UE 300-1 via the pico eNodeB 200. Thus, it becomes unnecessary for the UE 300-1 to keep acquiring the system information about the CC 1 in order to determine which subframe is the MBMS subframe in the CC 1. Therefore, the load on the UE 300-1 is reduced.

4.2. Configuration of UE

Figure 15:
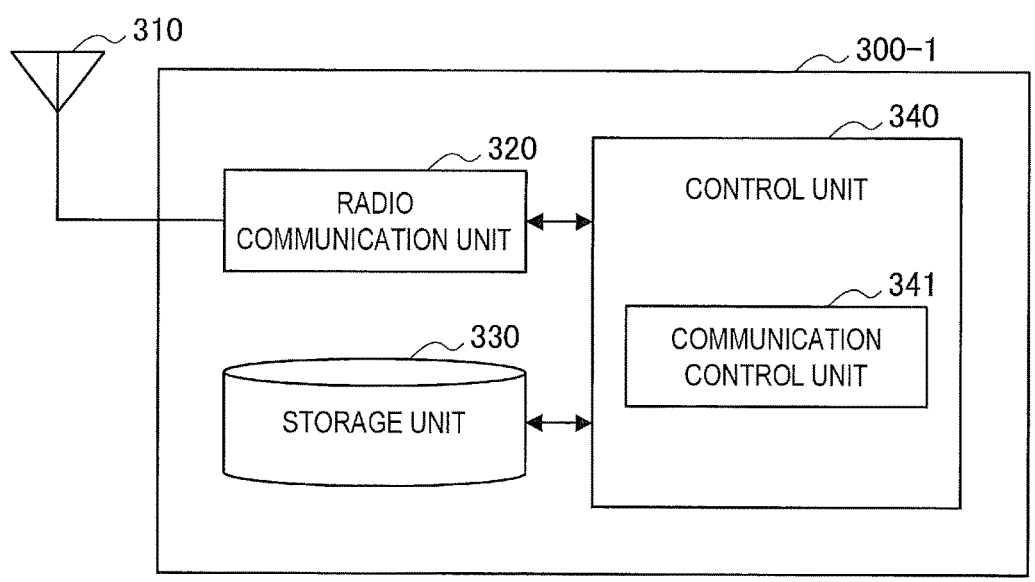
FIG. 15 is a block diagram illustrating an example of a configuration of a UE according to the first embodiment.

Next, the configuration of the UE 300-1 according to the first embodiment will be described with reference to FIG. 15. FIG. 15 is a block diagram illustrating an example of the configuration of the UE 300-1 according to the first embodiment. Referring to FIG. 15, there is shown the UE 300-1 including an antenna unit 310, a radio communication unit 320, a storage unit 330, and a control unit 340.

(Antenna Unit 310)

The antenna unit 310 receives a radio signal and outputs the received radio signal to the radio communication unit 320. In addition, the antenna unit 310 transmits a transmission signal output from the radio communication unit 320.

(Radio Communication Unit 320)

The radio communication unit 320 performs radio communication with the macro eNodeB 100-1 when the UE 300-1 is located within the macro cell 11. In addition, the radio communication unit 320 performs radio communication with the pico eNodeB 200 when the UE 300-1 is located within the pico cell 21.

In addition, the radio communication unit 320 can use a plurality of CCs for radio communication at the same time. Specifically, for example, using a plurality of CCs at the same time, the radio communication unit 320 can perform radio communication with the macro eNodeB 100-1 and/or the pico eNodeB 200. That is, the UE 300-1 supports carrier aggregation.

Furthermore, for example, the radio communication unit 320 establishes synchronization in the CC by the synchronization signal transmitted in the CC. As described above, for example, the synchronization signal is a CRS. For example, the radio communication unit 320 establishes synchronization by the CRS in the CC 1 used for the radio communication in the macro cell 11.

(Storage Unit 330)

The storage unit 330 stores a program and data for an operation of the UE 300-1.

(Control Unit 340)

The control unit 340 provides a variety of functions of the UE 300-1.

The control unit 340 includes a communication control unit 341.

(Communication Control Unit 341)

The communication control unit 341 controls radio communication performed by the UE 300-1 in the macro cell 11 and the pico cell 21 partially or entirely overlapping with the macro cell 11.

Control of Connection in CC 1

When the UE 300-1 satisfies the connection barring conditions, the communication control unit 341 does not allow the UE 300-1 to be connected in a radio resource in the CC 1. In addition, the connection barring conditions include synchronization of the UE 300-1 in the CC 2 by utilizing the synchronization result by the synchronization signal.

For example, the communication control unit 341 does not allow the UE 300-1 to be connected in a radio resource in the CC 1 by not performing a connection procedure to be connected in a radio resource in the CC 1.

In particular, in the first embodiment, upon being notified the barring of connection of the device satisfying the connection barring conditions in the CC 1, the communication control unit 341 does not perform a connection procedure to be connected in a radio resource in the CC 1.

More specifically, for example, the system information about the CC 1 of the macro cell 11 includes the access barring information indicating the barring of connection of the device satisfying the connection barring conditions in the CC 1. On the other hand, the UE 300-1 establishes synchronization by a synchronization signal such as a PSS or a SSS (and the synchronization signal such as the CRS) in the CC 1, and then acquires the system information about the CC 1 of the macro cell 11. Further, the communication control unit 341 of the UE 300-1 confirms that the system information includes the access barring information. Then, the communication control unit 341 determines whether or not the UE 300-1 satisfies the connection barring conditions. When the UE 300-1 satisfies the connection barring conditions, the communication control unit 341 does not perform a connection procedure to enter RRC_Connected in the CC 1. For example, the connection procedure is a random access procedure including the transmission of a random access preamble in a random access channel (RACH).

By refraining from the execution of such a connection procedure, it becomes possible to prevent the UE 300-1 from entering RRC_Connected in the CC 1 in advance when the UE 300-1 satisfies the connection barring conditions. As a result, it is possible to suppress the consumption of resources in the macro eNodeB 100-1.

Further, since the UE 300-1 does not perform the connection procedure in response to the notification of the barring of connection in the CC 1, it becomes possible to prevent the UE 300-1 from becoming RRC_Connected in the CC 1 in advance under control of the macro eNodeB 100-1.

Acquisition of System Information about CC 2

The communication control unit 341 acquires system information about a CC. For example, the communication control unit 341 acquires system information about the CC 2 of the pico cell 21.

In addition, for example, the communication control unit 341 does not acquire the system information about the CC 2 of the pico cell 21 from the system information supplied in the CC 1 of the macro cell 11. For example, the pico eNodeB 200 supplies the system information about the CC 2 in the CC 2, and the communication control unit 341 of the UE 300-1 acquires the system information supplied by the pico eNodeB 200.

Acquisition of Information Regarding MBMS

In addition, for example, when the macro eNodeB 100-1 supplies the MBMS information to the pico eNodeB 200, the communication control unit 341 of the UE 300 acquires the MBMS information supplied by the pico eNodeB 200.

Furthermore, for example, the communication control unit 341 controls synchronization by the UE 300-1 in the CC 1 on the basis of the MBMS information. Specifically, for example, when the radio communication unit 320 of the UE 300-1 establishes synchronization by the CRS in the CC 1, the absence of the CRS that is not inserted in a range corresponding to the PDSCH in the MBMS subframe is considered.

Note that, as described above, for example, the communication control unit 341 first acquires the MBMS information from the system information supplied by the macro eNodeB 100 in the CC 1. Then, the communication control unit 341 controls synchronization of the UE 300-1 (the radio communication unit 320) in the CC 1 on the basis of the MBMS information. Further, by utilizing the synchronization result by the CRS in the CC 1, the UE 300-1 (the radio communication unit 320) establishes synchronization in the CC 2. After that, when the MBMS information about the CC 1 of the macro cell 11 is changed, the macro eNodeB 100-1 supplies the MBMS information to the pico eNodeB 200. Then, the pico eNodeB 200 supplies the MBMS information to the UE 300-1. Finally, the communication control unit 341 controls synchronization of the UE 300-1 (the radio communication unit 320) in the CC 1 on the basis of the MBMS information that has been acquired via the pico eNodeB 200.

4.3. Flow of Process

Next, an example of communication control processing according to the first embodiment will be described with reference to FIG. 16 and FIG. 17.

(Communication Control Processing on the Macro eNodeB Side)

Figure 16:
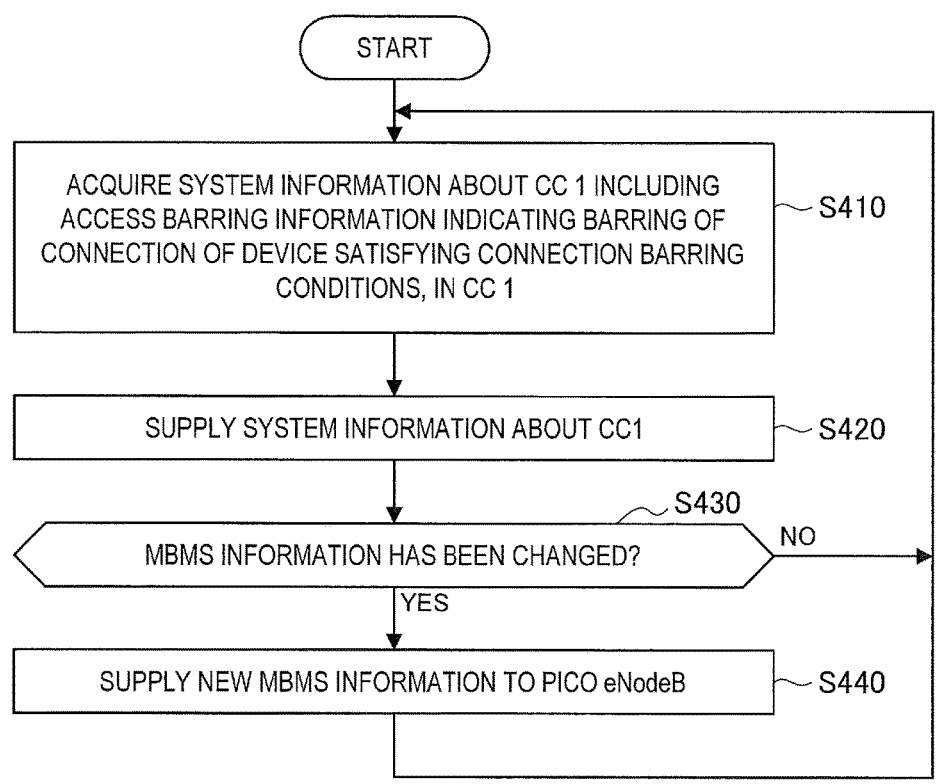
FIG. 16 is a flowchart illustrating an example of a schematic flow of communication control processing on a macro eNodeB side according to the first embodiment.

FIG. 16 is a flowchart illustrating an example of a schematic flow of communication control processing on the macro eNodeB side according to the first embodiment.

First, in step S410, the communication control unit 151 acquires the system information about the CC 1 including the access barring information indicating the barring of connection of the device satisfying the connection barring conditions, in the CC 1.

Next, in step S420, the communication control unit 151 supplies the system information about the CC 1 through the radio communication unit 120.

In addition, in step S430, the communication control unit 151 determines whether or not the MBMS information about the CC 1 of the macro cell 11 has been changed. If the MBMS information is changed, the processing goes to step S440. Otherwise, the processing goes back to the step S410.

In step S440, the communication control unit 151 supplies new MBMS information about the CC 1 of the macro cell 11 to the pico eNodeB 200 through the network communication unit 130. Then, the processing goes back to the step S410.

(Communication Control Processing on UE Side)

Figure 17:
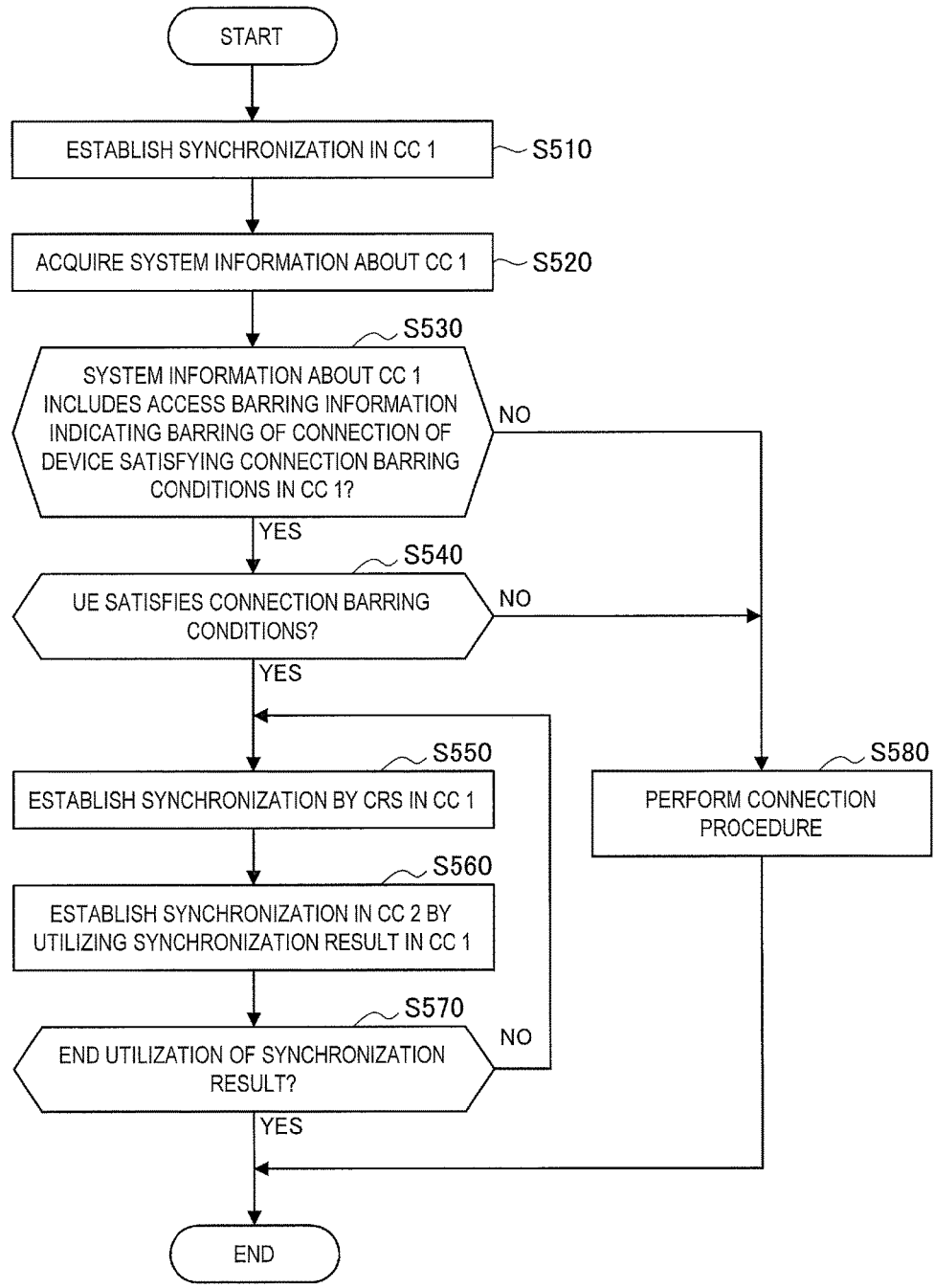
FIG. 17 is a flowchart illustrating an example of a schematic flow of communication control processing on a UE side according to the first embodiment.

FIG. 17 is a flowchart illustrating an example of the schematic flow of the communication control processing on the UE side according to the first embodiment.

First, in step S510, the UE 300-1 establishes synchronization by the PPS and the SSS (and the CRS) in the CC 1.

Next, in step S520, the communication control unit 341 acquires the system information about the CC 1 of the macro cell 11 through the radio communication unit 320.

Then, in step S530, the communication control unit 341 determines whether or not the system information about the CC 1 includes the access barring information indicating the barring of connection of the device satisfying the connection barring conditions in the CC 1. When the system information includes the access barring information, the processing goes to step S540. Otherwise, the processing goes to step S580.

In the step S540, the communication control unit 341 determines whether or not the UE 300-1 satisfies the connection barring conditions. When the UE 300-1 satisfies the connection barring conditions, the processing goes to step S550. Otherwise, the processing goes to the step S580.

In the step S550, the UE 300-1 establishes synchronization by the CRS in the CC 1. Here, in a case where the macro eNodeB 100-1 or the pico eNodeB 200 supplies the MBMS information, the UE 300-1 establishes synchronization by the CRS in the CC 1 on the basis of the MBMS information.

In step S560, the UE 300-1 establishes synchronization in the CC 2 by utilizing the synchronization result by the CRS in the CC 1.

Then, in step S570, the communication control unit 341 determines whether or not the UE 300-1 ends the utilization of the synchronization result by the CRS in the CC 1. In the case where the UE 300-1 ends the utilization of the synchronization result in the CC 1, the processing ends. Otherwise, the processing goes back to the step S550.

In step S580, the communication control unit 341 performs the connection procedure (such as a random access procedure) in order to enter RRC_Connected in the CC 1. Then, the processing ends.

4.4. Modification Example

In the above described example of the first embodiment, the system information about the CC 2 of the pico cell 21 is not supplied by the macro eNodeB 100 in the CC 1 of the macro cell 11. On the other hand, in a modification example of the first embodiment, the system information about the CC 2 of the pico cell 21 is supplied by the macro eNodeB 100 in the CC 1 of the macro cell 11. Thus, the UE 300 can acquire the system information about the CC 2 of the pico cell 21 in advance, before entering the pico cell 21.

(Macro eNodeB 100-1: Communication Control Unit 151)

Supply of System Information about CC 2

The communication control unit 151 of the macro eNodeB 100-1 supplies the system information in the CC 1 of the macro cell 11. Then, the system information supplied in the CC 1 includes the system information about the CC 2. That is, the communication control unit 151 supplies the system information about the CC 2 through the radio communication unit 120.

Thus, the UE 300 can acquire the system information about the CC 2 of the pico cell 21 in advance, before entering the pico cell 21.

In addition, for example, the system information supplied in the CC 1 includes part of the system information about the CC 2. That is, the communication control unit 151 supplies part of the system information about the CC 2 through the radio communication unit 120.

Thus, compared with a case where the macro eNodeB 100-1 supplies all the system information about the CC 2, the consumption of resources in the macro eNodeB 100-1 can be suppressed.

Furthermore, for example, the part of the system information about the CC 2 is common to system information about another CC other than the CC 1 and the CC 2, among pieces of the system information about the CC 2. That is, the communication control unit 151 supplies information that is common to the system information about another CC among pieces of the system information about the CC 2 through the radio communication unit 120. A specific example regarding this point will be shown below with reference to FIG. 18.

Figure 18:
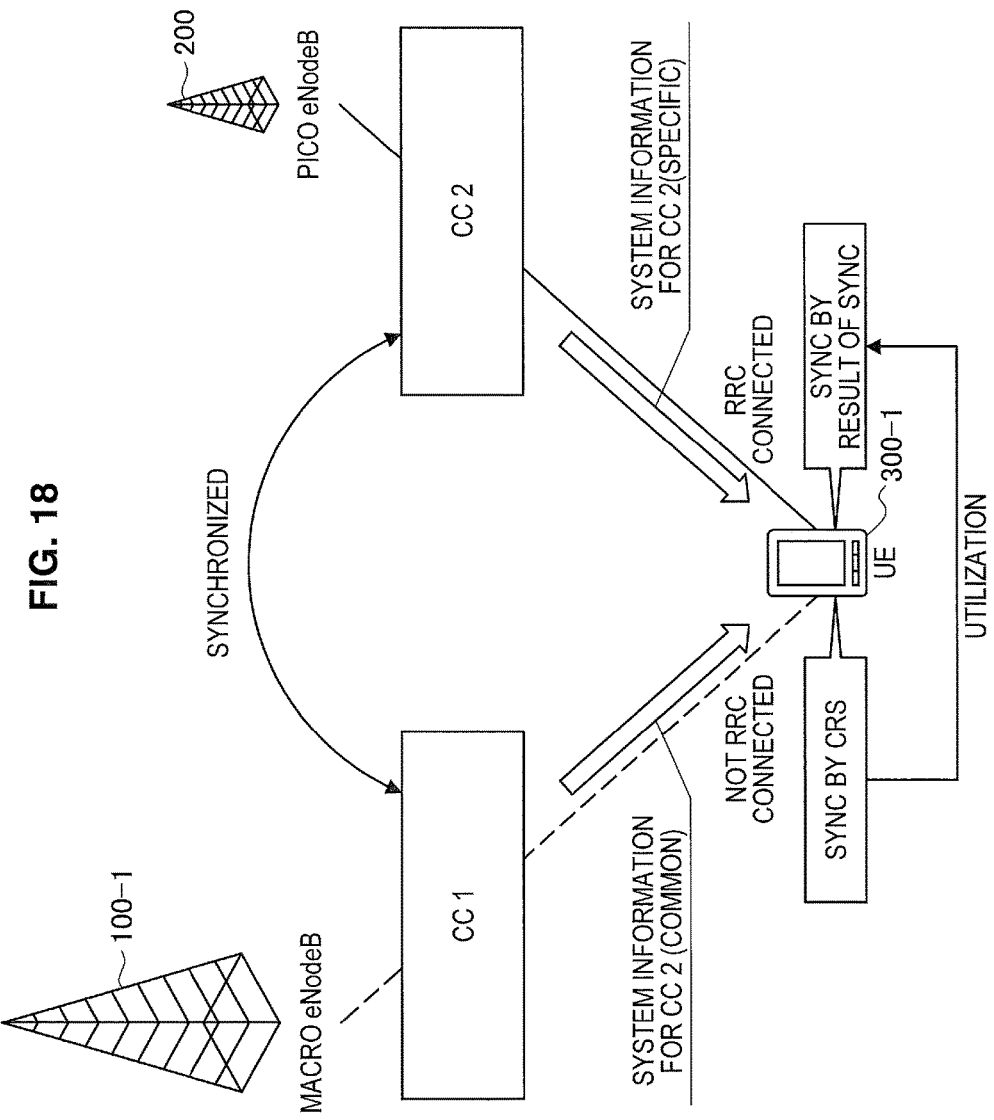
FIG. 18 is an explanatory diagram illustrating a second example of a route of supplying system information about a CC used for radio communication in a pico cell.

FIG. 18 is an explanatory diagram illustrating a second example of the route of supplying system information about the CC used for the radio communication in the pico cell 21. Referring to FIG. 18, there are shown, as in FIG. 12 and FIG. 13, the CC 1 used by the macro eNodeB 100-1, the CC 2 used by the pico eNodeB 200, and the UE 300-1. In addition, since the UE 300-1 satisfies the connection barring conditions, the UE 300-1 does not enter RRC_Connected in the CC 1 of the macro cell 11.

In addition, the UE 300-1 establishes synchronization in the CC 2 of the pico cell 21 by utilizing the synchronization result by the CRS in the CC 1. In the example of FIG. 18, in particular, among pieces of the system information about the CC 2 of the pico cell 21, information common to the system information about another CC other than the CC 1 and the CC 2 is supplied in the CC 1 of the macro cell 11 by the macro eNodeB 100-1. Further, for example, the other pieces of information of the system information about the CC 2 of the pico cell 21 are supplied by the pico eNodeB 200 in the CC 2 of the pico cell 21.

Thus, it becomes possible to supply the system information more efficiently than in a case where system information for each CC is supplied individually. In addition, if the information is common to the CCs, since the information amount is not increased in proportion to the number of pico cells 21, the consumption of resources in the macro eNodeB 100-1 can be suppressed.

(UE 300-1: Communication Control Unit 341)

The communication control unit 341 acquires the system information about the CC 2 from the system information supplied in the CC 1.

For example, the communication control unit 341 acquires part of the system information about the CC 2 from the system information supplied in the CC 1 of the macro cell 11, and acquires the remaining system information about the CC 2 from system information supplied in a CC other than the CC 1. The CC other than the CC 1 is the CC 2 of the pico cell 21, for example.

Furthermore, for example, the communication control unit 341 acquires information common to system information about another CC other than the CC 1 and the CC 2 among the pieces of the system information about the CC 2 from the system information supplied in the CC 1 of the macro cell 11. In addition, the communication control unit 341 acquires information that is unique to the CC 2 among the pieces of the system information about the CC 2 from the system information supplied in the CC other than the CC 1. The CC other than the CC 1 is the CC 2 of the pico cell 21, for example.

(Flow of Process)

Next, an example of communication control processing according to the modification example of the first embodiment will be described with reference to FIG. 19 and FIG. 20.

Communication Control Processing on the Macro eNodeB Side

Figure 19:
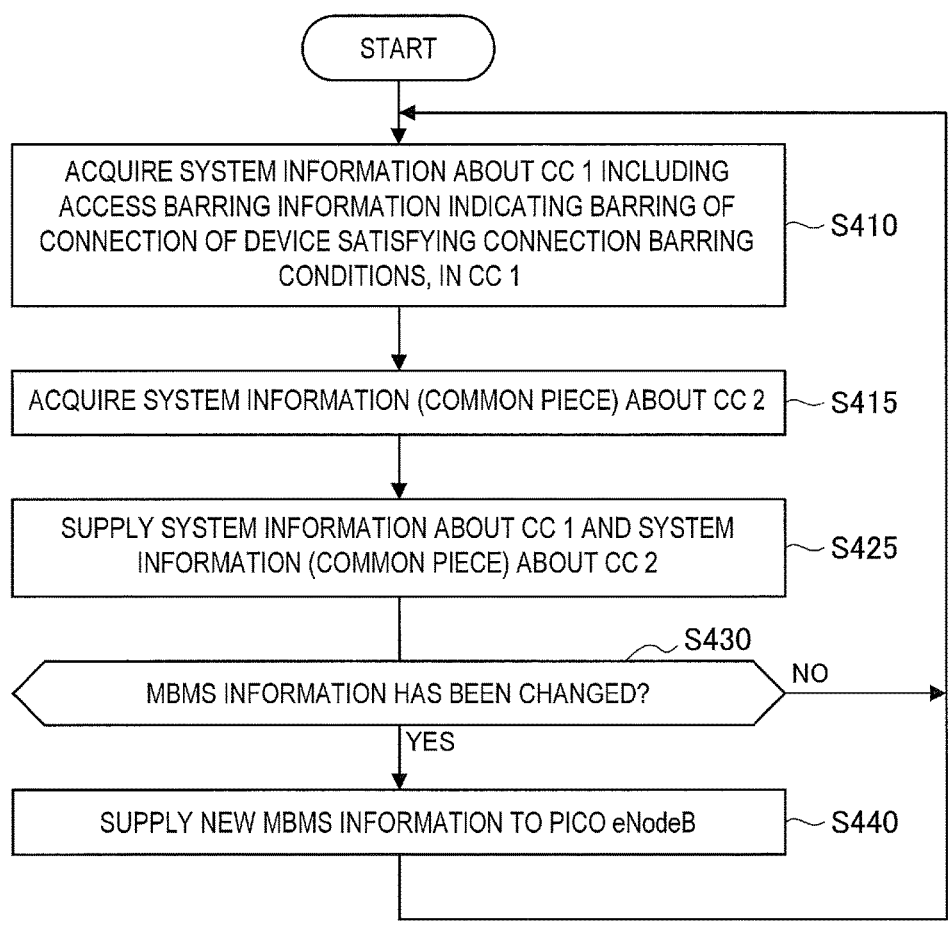
FIG. 19 is a flowchart illustrating an example of a schematic flow of communication control processing on a macro eNodeB side according to a modification example of the first embodiment.

FIG. 19 is a flowchart illustrating an example of a schematic flow of communication control processing on the macro eNodeB side according to the modification example of the first embodiment. Here, only step S415 and step S425, which are differences between the example of the communication control processing according to the first embodiment that has been described with reference to FIG. 16 and the example of the communication control processing according to the modification example of the first embodiment will be described.

In the step S415, the communication control unit 151 acquires the system information (common piece) about the CC 2 of the pico cell 21.

Then, in the step S425, the communication control unit 151 supplies the system information about the CC 1 of the macro cell 11 and the system information (common piece) about the CC 2 of the pico cell 21 through the radio communication unit 120.

Communication Control Processing on UE Side

Figure 20:
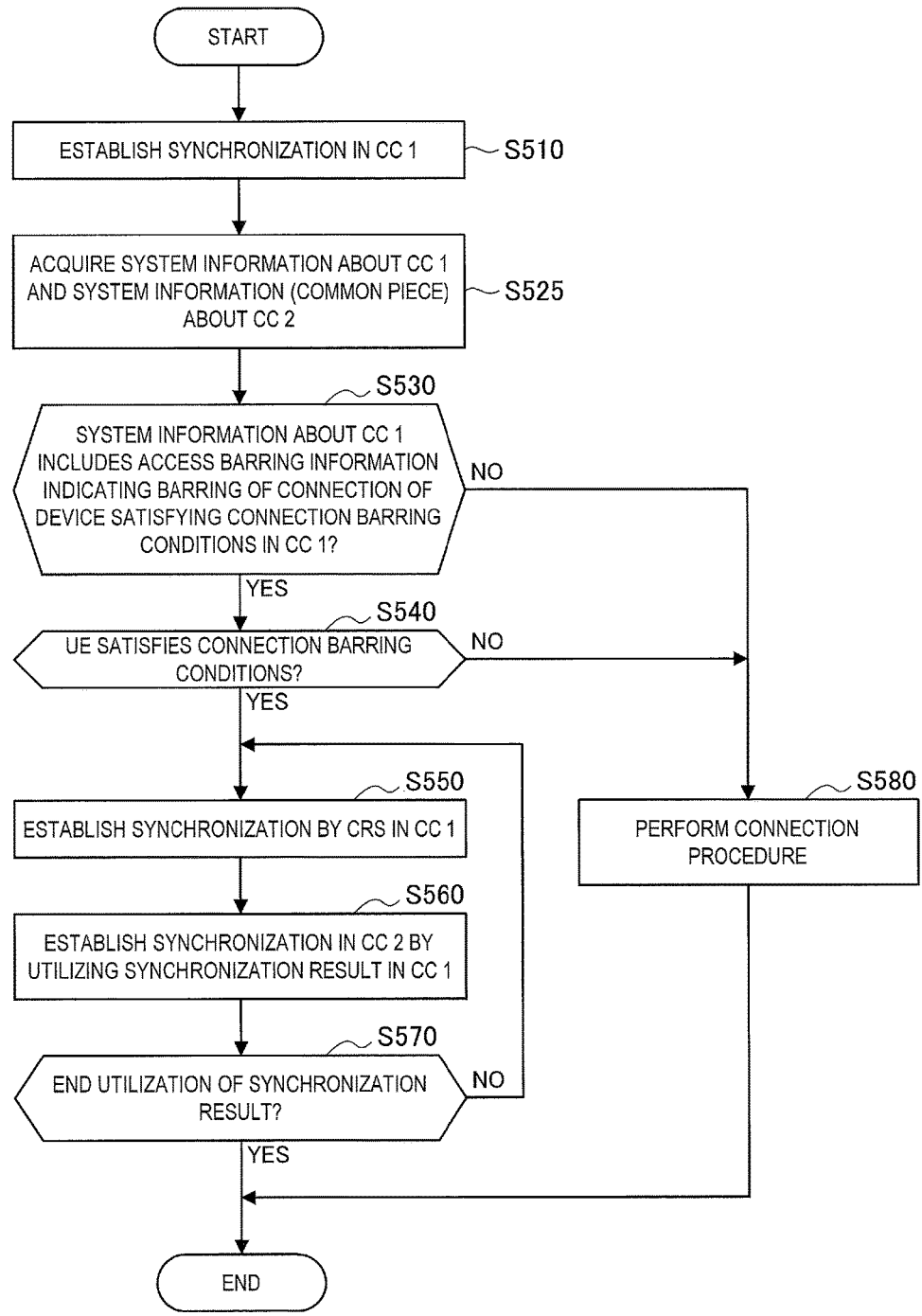
FIG. 20 is a flowchart illustrating an example of a schematic flow of communication control processing on a UE side according to a modification example of the first embodiment.

FIG. 20 is a flowchart illustrating an example of the schematic flow of the communication control processing on the UE side according to the modification example of the first embodiment. Here, only step S525, which is a difference between the example of the communication control processing according to the first embodiment that has been described with reference to FIG. 20 and the example of the communication control processing according to the modification example of the first embodiment will be described.

Next, in step S520, the communication control unit 341 acquires the system information about the CC 1 of the macro cell 11 and the system information (common piece) about the CC 2 of the pico cell 21 through the radio communication unit 320.

The first embodiment of the present disclosure has been described above. As described above, according to the first embodiment of the present disclosure, the consumption of resources in the macro eNodeB 100 can be suppressed under control of the macro eNodeB 100.

5. Second Embodiment

Figure 21:
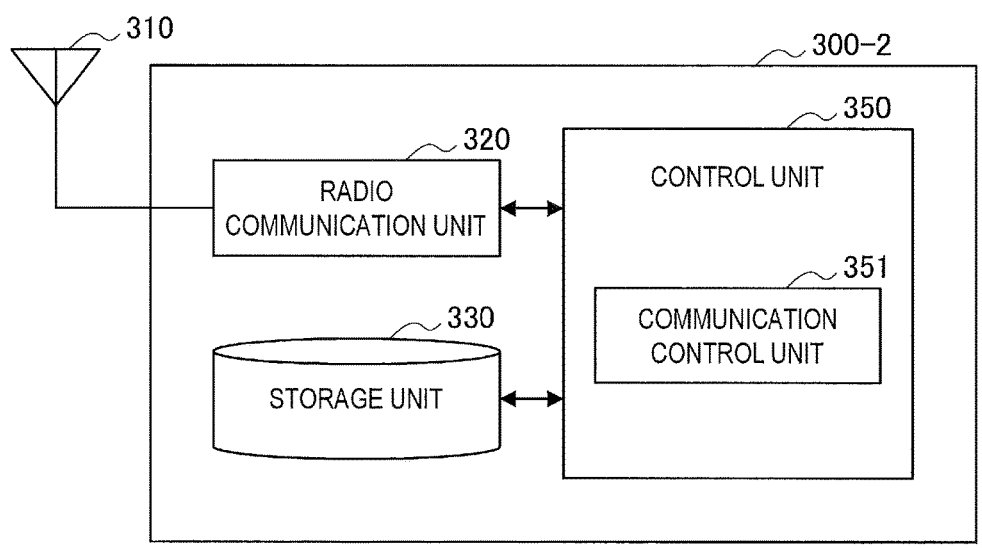
FIG. 21 is a block diagram illustrating an example of a configuration of a UE according to a second embodiment.

Next, a second embodiment of the present disclosure will be described with reference to FIG. 21 to FIG. 23. According to the second embodiment of the present disclosure, it becomes possible to suppress the consumption of resources in the macro eNodeB 100 by spontaneous control of the UE 300.

5.1. Configuration of Macro eNodeB

The macro eNodeB 100-1 (the communication control unit 151) according to the first embodiment does not allow the UE 300-1 satisfying the connection barring conditions to be connected (RRC_Connected) in a radio resource in the CC 1.

On the other hand, a macro eNodeB 100-2 according to the second embodiment does not perform such a control on a UE 300-2 satisfying the connection barring conditions. For example, the macro eNodeB 100-2 does not supply the access barring information indicating the barring of connection of the device satisfying the connection barring conditions in the CC 1 using system information.

Except for such a difference, the configuration of the macro eNodeB 100-2 according to the second embodiment is the same as the configuration of the macro eNodeB 100-1 according to the first embodiment.

5.2. Configuration of UE

Next, the configuration of the UE 300-2 according to the second embodiment will be described with reference to FIG. 21. FIG. 21 is a block diagram illustrating an example of the configuration of the UE 300-2 according to the second embodiment. Referring to FIG. 21, there is shown the UE 300-2 including the antenna unit 310, the radio communication unit 320, the storage unit 330, and a control unit 350.

Here, the antenna unit 310, the radio communication unit 320, and the storage unit 330 in the second embodiment are the same as those in the first embodiment. Accordingly, only a communication control unit 351 in the control unit 350 will be described here.

(Communication Control Unit 351)

The communication control unit 351 controls radio communication performed by the UE 300-2 in the macro cell 11 and the pico cell 21 partially or entirely overlapping with the macro cell 11.

Control of Connection in CC 1

When the UE 300-2 satisfies the connection barring conditions, the communication control unit 351 does not allow the UE 300-2 to be connected in a radio resource in the CC 1. In addition, the connection barring conditions include synchronization of the UE 300-2 in the CC 2 by utilizing the synchronization result by the synchronization signal. This point is the same as in the first embodiment.

For example, the communication control unit 351 does not allow the UE 300-2 to be connected in a radio resource in the CC 1 by not performing a connection procedure to be connected in a radio resource in the CC 1. This point is also the same as in the first embodiment.

In particular, in the second embodiment, when the UE 300-2 satisfies the connection barring conditions, the communication control unit 351 does not spontaneously perform a connection procedure to be connected in a radio resource in the CC 1.

More specifically, for example, the communication control unit 351 establishes synchronization in the CC 1 by a synchronization signal such as a PSS or a SSS (and a synchronization signal such as a CRS) and acquires system information about the CC 1. Then, when the connection barring conditions are satisfied, the UE 300-1 does not perform a connection procedure spontaneously to enter RRC_Connected in the CC 1. On the other hand, when the connection barring conditions are not satisfied, the UE 300-1 performs the connection procedure as needed to enter RRC_Connected in the CC 1. For example, the connection procedure is a random access procedure including the transmission of a random access preamble in a random access channel (RACH).

By not performing such a connection procedure, when the UE 300-2 satisfies the connection barring conditions, the UE 300-2 can be prevented in advance from entering RRC_Connected in the CC 1. As a result, the consumption of resources in the macro eNodeB 100-2 can be suppressed.

In addition, by not performing the connection procedure spontaneously by the UE 300-1, the control by the macro eNodeB 100-2 becomes unnecessary. Accordingly, the consumption of resources (such as radio resources and process resources for the transmission of control information) in the macro eNodeB 100-2 can be suppressed.

Acquisition of System Information about CC 2.

The communication control unit 351 acquires system information about a CC. For example, the communication control unit 351 acquires system information about the CC 2 of the pico cell 21. This point is the same as in the first embodiment (or the modification example according to the first embodiment).

Acquisition of Information Regarding MBMS

In addition, for example, when the macro eNodeB 100-2 supplies the MBMS information to the pico eNodeB 200, the communication control unit 351 of the UE 300 acquires the MBMS information supplied by the pico eNodeB 200. This point is also the same as in the first embodiment.

5.3. Flow of Process

Next, an example of communication control processing according to the second embodiment will be described with reference to FIG. 22 and FIG. 23.

(Communication Control Processing on Macro eNodeB Side)

Figure 22:
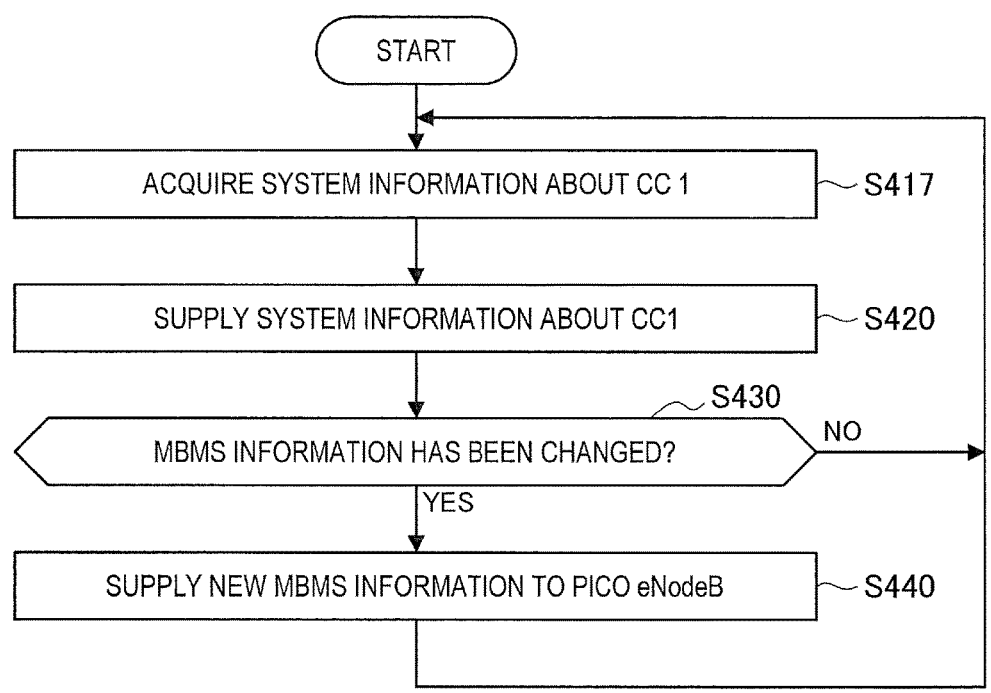
FIG. 22 is a flowchart illustrating an example of a schematic flow of communication control processing on a macro eNodeB side according to the second embodiment.

FIG. 22 is a flowchart illustrating an example of a schematic flow of communication control processing on the macro eNodeB side according to the second embodiment. Here, only step S417, which is a difference between the example of the communication control processing according to the first embodiment that has been described with reference to FIG. 16 and the example of the communication control processing according to the second embodiment, will be described.

In the step S417, the macro eNodeB 100-2 acquires the system information about the CC 1 of the macro cell 11.

(Communication Control Processing on UE Side)

Figure 23:
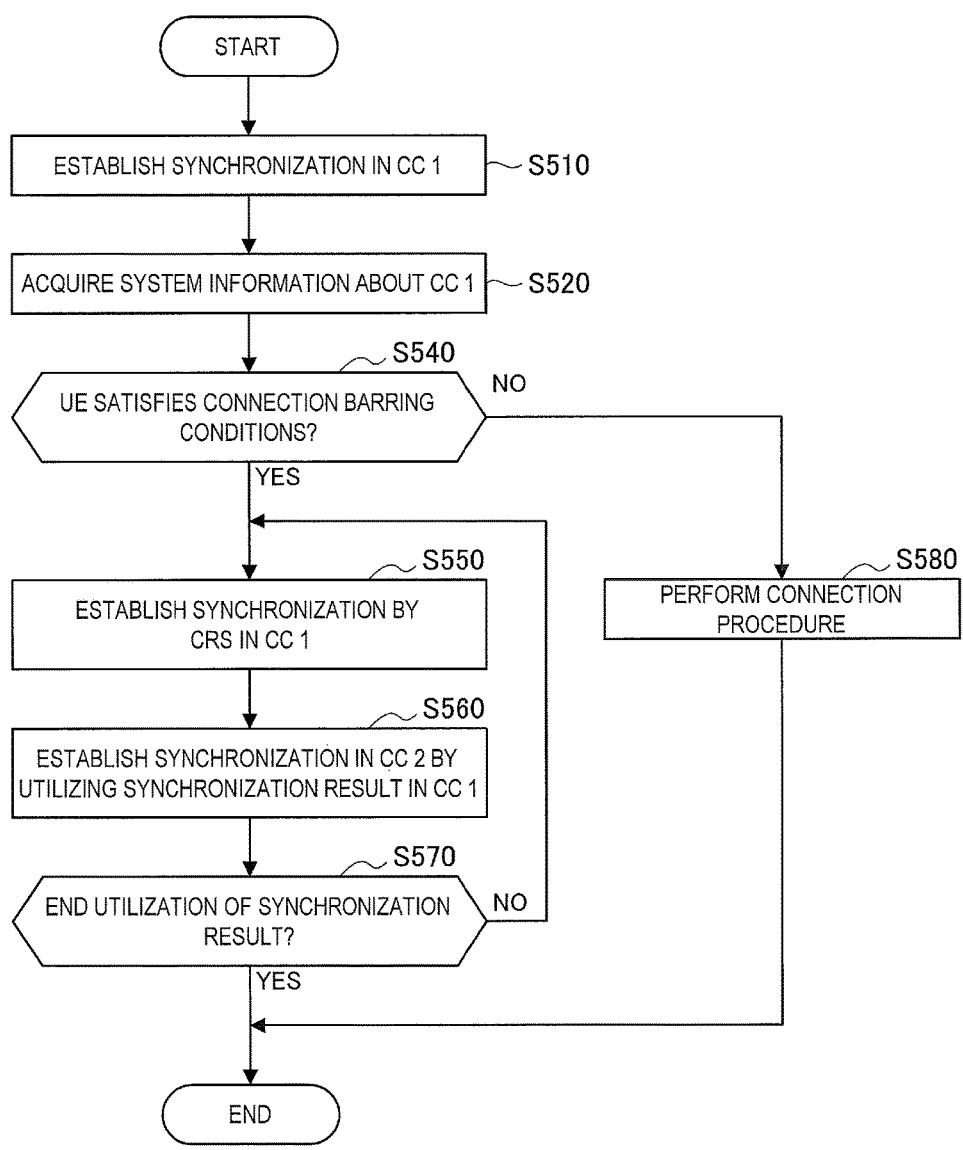
FIG. 23 is a flowchart illustrating an example of a schematic flow of communication control processing on a UE side according to the second embodiment.

FIG. 23 is a flowchart illustrating an example of the schematic flow of the communication control processing on the UE side according to the second embodiment. Referring to FIG. 17 and FIG. 23, the difference between the example of the communication control processing according to the first embodiment and the example of the communication control processing according to the second embodiment is that the communication control processing according to the first embodiment includes the step S530 but the communication control processing according to the second embodiment does not include the step S530.

The second embodiment of the present disclosure has been described above. As described above, according to the second embodiment of the present disclosure, by the spontaneous control by the UE 300, the consumption of resources in the macro eNodeB 100 can be suppressed.

6. Application Examples

The technology related to the present disclosure can be applied to various products. For example, the macro eNodeB 100 may be realized as an eNodeB 800 including a body (also referred to as a base station device) controlling radio communication and an antenna. Alternatively, the macro eNodeB 100 may be realized as an eNodeB 830 including a body controlling radio communication, one or more remote radio heads (RRHs) disposed in different locations from the body, and an antenna. In addition, later-described various types of terminals may operate as the macro eNodeB 100 by executing functions as a base station temporarily or semi-permanently.

In addition, the UE 300 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 300 may also be realized as a terminal that conducts machine-to-machine (M2M) communication (also called a machine-type communication (MTC) terminal). Furthermore, the UE 300 may be a radio communication module mounted onboard these terminals (for example, an integrated circuit module configured on a single die).

6.1. Applications Related to Macro eNodeB (First Application)

Figure 24:
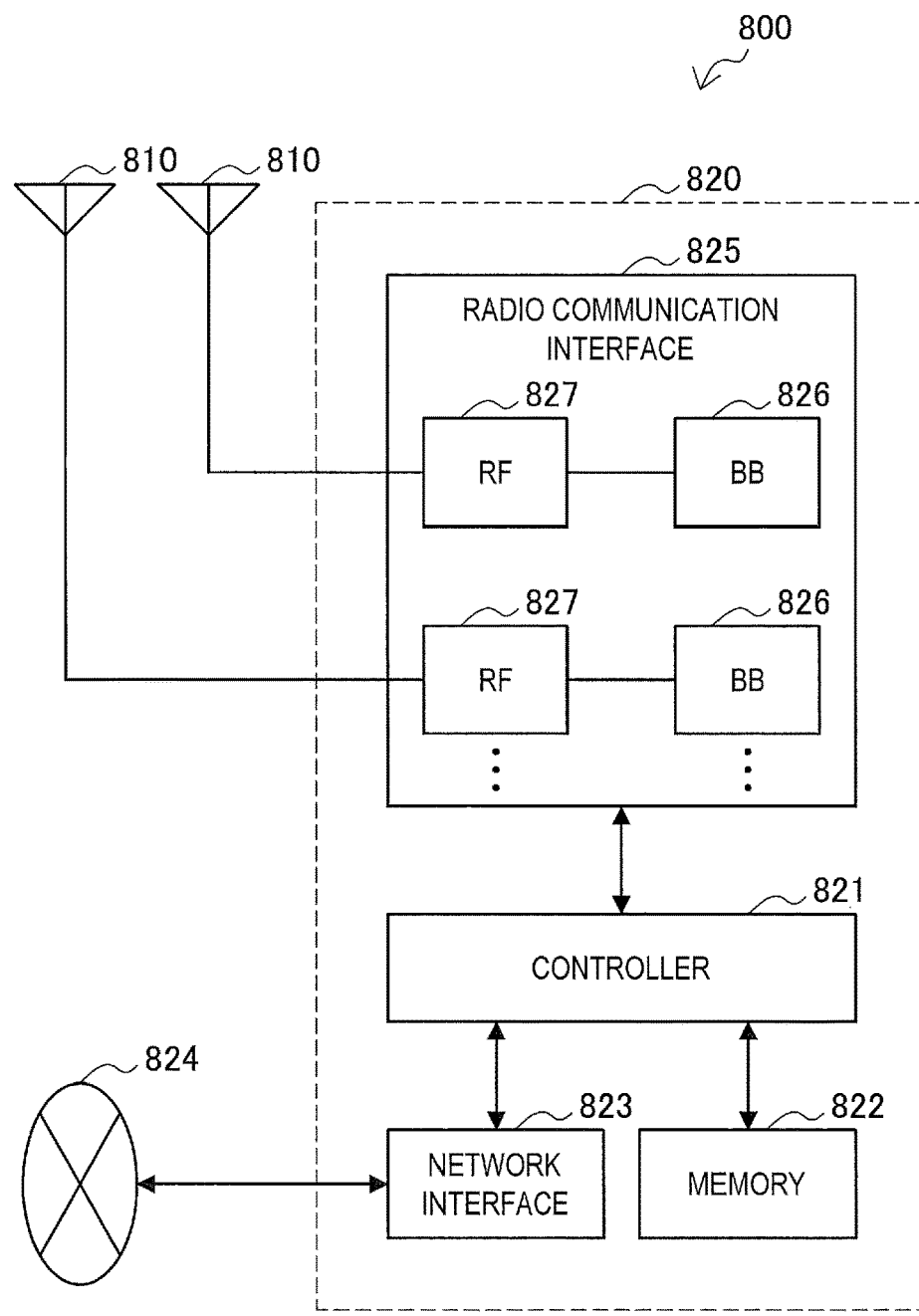
FIG. 24 is a block diagram illustrating a first example of a schematic configuration of an eNodeB to which the technology according to the present disclosure may be applied.

FIG. 24 is a block diagram illustrating a first example of a schematic configuration of an eNodeB to which the technology according to the present disclosure may be applied. An eNodeB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNodeB 800 may include multiple antennas 810 as illustrated in FIG. 24, and the multiple antennas 810 may respectively correspond to multiple frequency bands used by the eNodeB 800, for example. Note that although FIG. 24 illustrates an example of the eNodeB 800 including multiple antennas 810, the eNodeB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as radio resource control (RRC), radio bearer control, mobility management, admission control, or scheduling. Also, such controls may also be executed in coordination with a nearby eNodeB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communicate with a core network node or another eNodeB via the network interface 823. In this case, the eNodeB 800 and the core network node or other eNodeB may be connected to each other by a logical interface (for example, the S1 interface or the X2 interface). The network interface 823 may also be a wired communication interface, or a radio communication interface for wireless backhaul. In the case in which the network interface 823 is a radio communication interface, the network interface 823 may use a higher frequency band for radio communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNodeB 800 via the antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amplifier, and transmits and receives a radio signal via the antenna 810.

The radio communication interface 825 may also include multiple BB processors 826 as illustrated in FIG. 24, and the multiple BB processors 826 may respectively correspond to multiple frequency bands used by the eNodeB 800, for example. In addition, the radio communication interface 825 may also include multiple RF circuits 827 as illustrated in FIG. 24, and the multiple RF circuits 827 may respectively correspond to multiple antenna elements, for example. Note that although FIG. 24 illustrates an example of the radio communication interface 825 including multiple BB processors 826 and multiple RF circuits 827, the radio communication interface 825 may also include a single BB processor 826 or a single RF circuit 827.

(Second Application)

Figure 25:
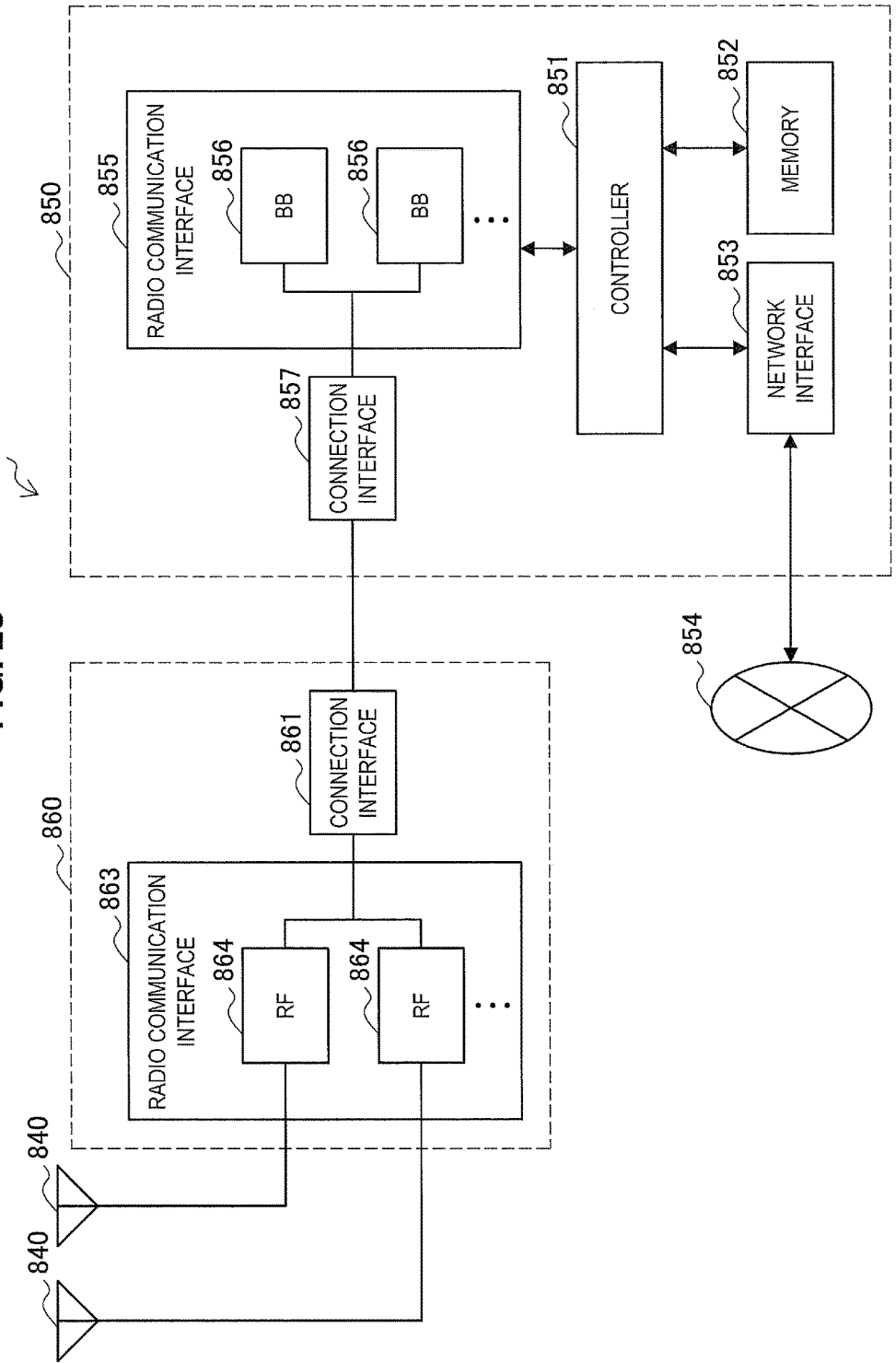
FIG. 25 is a block diagram illustrating a second example of a schematic configuration of an eNodeB to which the technology according to the present disclosure may be applied.

FIG. 25 is a block diagram illustrating a second example of a schematic configuration of an eNodeB to which the technology according to the present disclosure may be applied. An eNodeB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNodeB 830 may include multiple antennas 840 as illustrated in FIG. 25, and the multiple antennas 840 may respectively correspond to multiple frequency bands used by the eNodeB 830, for example. Note that although FIG. 25 illustrates an example of the eNodeB 830 including multiple antennas 840, the eNodeB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 24.

The radio communication interface 855 supports a cellular communication scheme such as LTE or LTE-Advanced, and provides a radio connection to a terminal positioned inside a sector corresponding to the RRH 860 via the RRH 860 and the antenna 840. Typically, the radio communication interface 855 may include a BB processor 856 and the like. The BB processor 856 is similar to the BB processor 826 described with reference to FIG. 24, except for being connected to an RF circuit 864 of the RRH 860 via the connection interface 857. The radio communication interface 855 may also include multiple BB processors 856 as illustrated in FIG. 25, and the multiple BB processors 856 may respectively correspond to multiple frequency bands used by the eNodeB 830, for example. Note that although FIG. 25 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amplifier, and transmits and receives a radio signal via the antenna 840. The radio communication interface 863 may also include multiple RF circuits 864 as illustrated in FIG. 25, and the multiple RF circuits 864 may respectively correspond to multiple antenna elements, for example. Note that although FIG. 25 illustrates an example of the radio communication interface 863 including multiple RF circuits 864, the radio communication interface 863 may also include a single RF circuit 864.

In the eNodeB 800 and the eNodeB 830 illustrated in FIGS. 24 and 25, the communication control unit 151 described with reference to FIG. 11 may be implemented in the radio communication interface 825 as well as the radio communication interface 855 and/or the radio communication interface 863. Also, at least a part of the function may also be implemented in the controller 821 and the controller 851.

6.2. Applications Related to UE (First Application)

Figure 26:
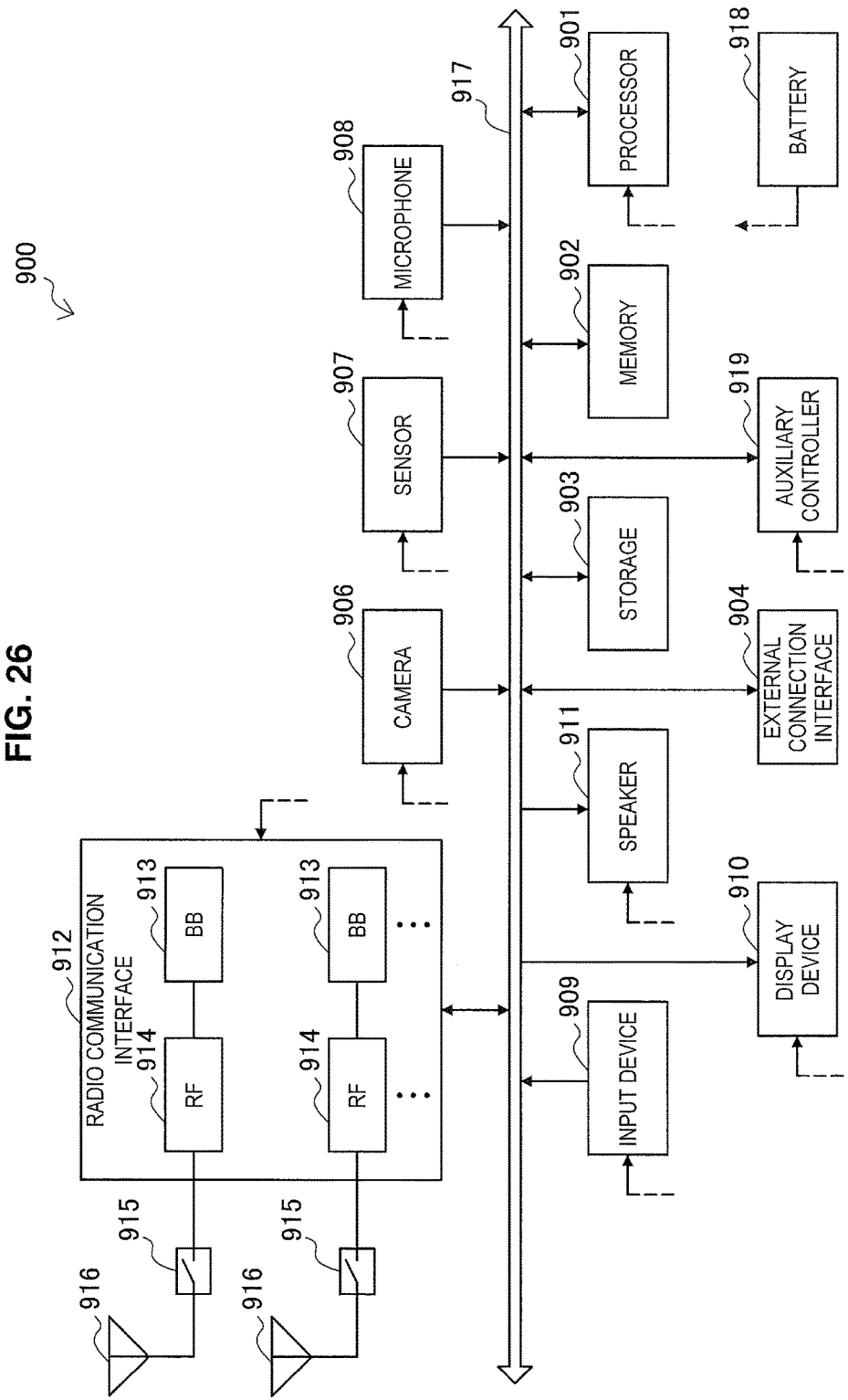
FIG. 26 is a block diagram illustrating an example of a schematic configuration of a smartphone to which the technology according to the present disclosure may be applied.

FIG. 26 is a block diagram illustrating an example of a schematic configuration of a smartphone 900 to which the technology according to the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amplifier, and transmits and receives a radio signal via the antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 26. Note that although FIG. 26 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range radio communication scheme, a near field radio communication scheme, or a wireless local area network (LAN) scheme. In this case, a BB processor 913 and an RF circuit 914 may be included for each radio communication scheme.

Each antenna switch 915 switches the destination of the antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 26. Note that although FIG. 26 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 26 via power supply lines partially illustrated with dashed lines in the drawing. The auxiliary controller 919 causes minimal functions of the smartphone 900 to operate while in a sleep mode, for example.

In the smartphone 900 illustrated in FIG. 26, the communication control unit 341 described with reference to FIG. 15 and the communication control unit 351 described with reference to FIG. 21 may be implemented in the radio communication interface 912. Also, at least part of each function may also be implemented in the processor 901 or the auxiliary controller 919.

(Second Application)

Figure 27:
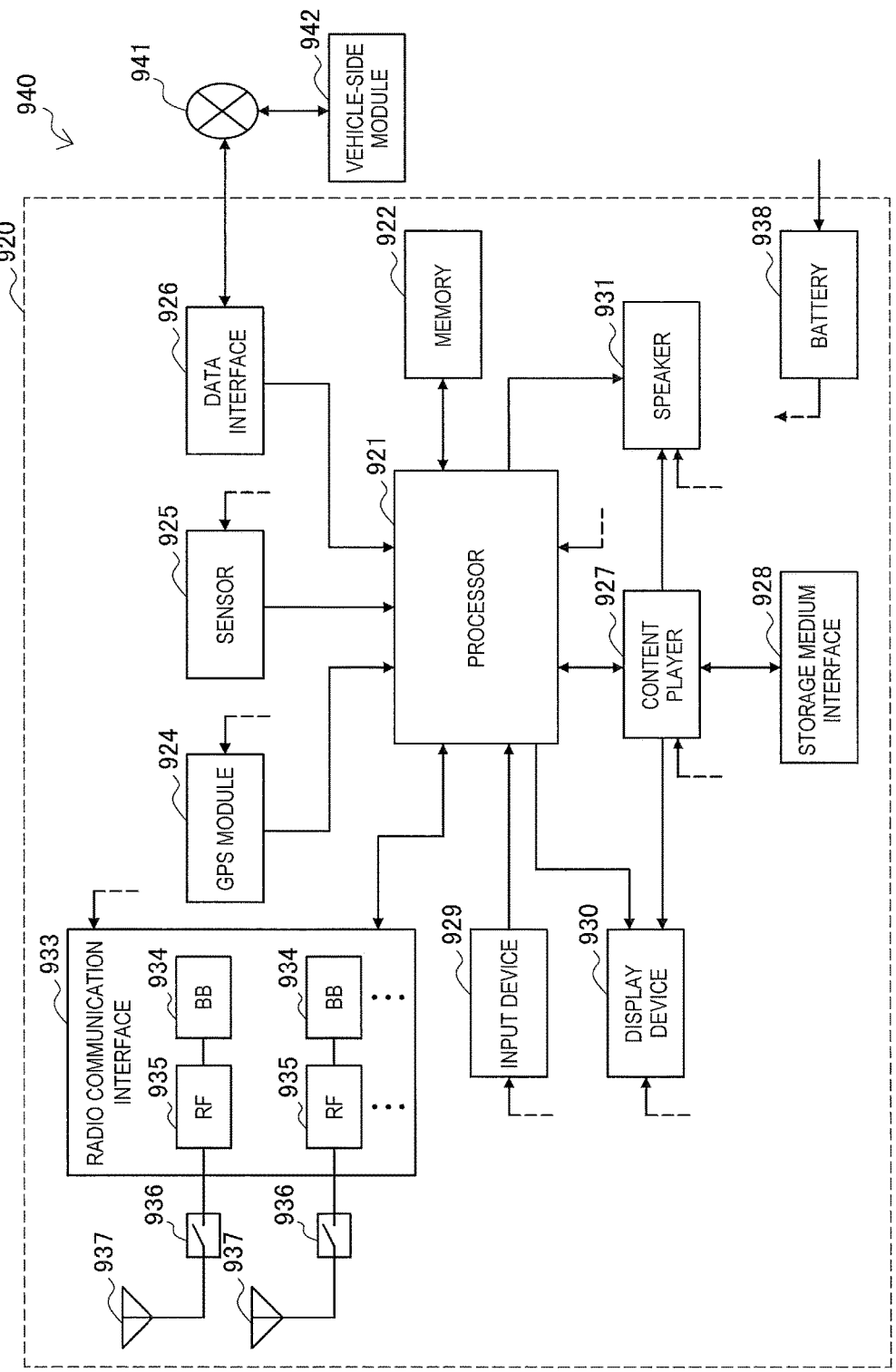
FIG. 27 is a block diagram illustrating an example of a schematic configuration of a car navigation device to which the technology according to the present disclosure may be applied.

FIG. 27 is a block diagram illustrating an example of a schematic configuration of a car navigation device 920 to which the technology according to the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amplifier, and transmits and receives a radio signal via the antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 27. Note that although FIG. 27 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range radio communication scheme, a near field radio communication scheme, or a wireless LAN scheme. In this case, a BB processor 934 and an RF circuit 935 may be included for each radio communication scheme.

Each antenna switch 936 switches the destination of the antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 27. Note that although FIG. 27 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 27 via power supply lines partially illustrated with dashed lines in the drawing. Also, the battery 938 stores electric power supplied from the vehicle.

In the car navigation device 920 illustrated in FIG. 27, the communication control unit 341 described with reference to FIG. 15 and the communication control unit 351 described with reference to FIG. 21 may be implemented in the radio communication interface 933. Also, at least some of these functions may also be implemented in the processor 921.

In addition, the technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

7. Conclusion

The macro eNodeB 100, the UE 300, and each kind of the communication control processing according to an embodiment of the present disclosure have been described above with reference to FIG. 10 to FIG. 23. According to an embodiment of the present disclosure, the CC 1 used for radio communication in the macro cell 11 is synchronized with the CC 2 used for radio communication in the pico cell 21. Further, in the CC 1, the synchronization signal for synchronization in the CC 1 is transmitted. In addition, the UE 300 satisfying the connection barring conditions is not connected in a radio resource in the CC 1. The connection barring conditions include synchronization of the UE 300 in the CC 2 utilizing the synchronization result by the synchronization signal.

Thus, in a case where the CC 1 of the macro cell 11 is used by the UE 300 for utilizing the synchronization result, it is possible to suppress the consumption of resources in the macro eNodeB 100.

More specifically, a large number of the UEs 300 can exist within the macro cell 11, and the large number of UEs 300 can utilize the synchronization result in the CC 1 of the macro cell 11 for synchronization in the CC 2 of the pico cell 21. In this case, if the large number of UEs 300 enter RRC_Connected in the CC 1, a large number of resources can be consumed in the macro eNodeB 100. For example, in the macro eNodeB 100, memory resources for holding data addressed to the large number of UEs 300, radio resources for signaling to the large number of UEs 300, and process resources for signaling to the large number of UEs 300 can be consumed.

Accordingly, by preventing some or all of the UEs 300 that utilize the synchronization result in the CC 1 for synchronization in the CC 2 of the pico cell 21 from entering RRC_Connected in the CC 1, it becomes possible to suppress the consumption of resources in the macro eNodeB 100. For example, it is possible to suppress the consumption of the memory resources in the macro eNodeB 100, the radio resources used by the macro eNodeB 100, the process resources in the macro eNodeB 100, and the like.

In addition, according to the first embodiment, the macro eNodeB 100 does not allow the UE 300 satisfying the connection barring conditions to be connected in a radio resource in the CC 1.

Thus, it is also possible to not allow the UE 300 to enter RRC_Connected selectively on the network side (the macro eNodeB 100-1 side). As an example, in a case where a large number of the pico cells 21 are deployed within the macro cell 11, the macro eNodeB 100 does not allow the UE 300 satisfying the connection barring conditions to be connected; in a case where only a small number of the pico cells 21 are deployed within the macro cell 11, the macro eNodeB 100 may allow even the UE 300 satisfying the connection barring conditions to be connected.

Furthermore, as an example of the specific method, the macro eNodeB 100 notifies the UE 300 of the barring of connection of the device satisfying the connection barring conditions in the CC 1 so that the UE 300 can refrain from being connected in a radio resource in the CC 1.

Thus, the UE 300 satisfying the connection barring conditions can be prevented in advance from entering RRC_Connected in the CC 1. That is, it is possible to prevent the UE 300 from entering RRC_Connected in advance in the CC 1 instead of restoring the UE 300 that has entered RRC_Connected in the CC 1 to RRC_IDLE. Accordingly, it is possible to suppress the generation of useless communication and processing related to the connection procedure.

Furthermore, for example, the macro eNodeB 100 notifies the UE 300 of the barring of connection using system information supplied in the CC 1.

Thus, it becomes possible to notify the UE 300-1 that does not enter RRC_Connected.

On the other hand, according to the second embodiment, in a case where the UE 300 satisfies the connection barring conditions, the UE 300 is not allowed to be connected in a radio resource in the CC 1.

Thus, the control by the macro eNodeB 100 becomes unnecessary. Accordingly, the consumption of resources (such as radio resources and process resources for the transmission of control information) in the macro eNodeB 100 can be suppressed.

Furthermore, for example, the connection barring conditions further include the UE 300 refraining from transmitting and receiving data using the CC 1.

Thus, the consumption of resources in the macro eNodeB 100-1 can be suppressed, and the UE 300-1 can transmit and receive data using the CC 1 of the macro cell 11.

More specifically, when all of the UEs 300 that utilize the synchronization result in the CC 1 for synchronization in the CC 2 are not allowed to enter RRC_Connected, the transmission and reception of data by the UE 300 using the CC 1 can be considerably restricted. For example, in a case where the synchronization result in the CC 1 is utilized for synchronization in the CC 2, the UE 300 cannot transmit and receive data using the CC 1. Further, from another viewpoint, except under the condition that the synchronization result in the CC 1 is not utilized for synchronization in the CC 2, the UE 300 cannot transmit and receive data using the CC 1.

Accordingly, among the UEs 300 that utilize the synchronization result in the CC 1, in particular, the UE 300 that does not transmit and receive data using the CC 1 is not allowed to enter RRC_Connected in the CC 1, thereby enabling the UE 300 to transmit and receive data using the CC 1 of the macro cell 11 more freely. That is, the UE 300 can transmit and receive data using the CC 1 while utilizing the synchronization result in the CC 1. Further, since the UE 300 that does not transmit and receive data using the CC 1 does not enter RRC_Connected in the CC 1, it is possible to suppress the consumption of process resources in the macro eNodeB 100 and the like.

In addition, for example, the system information supplied in the CC 1 does not include system information about the CC 2.

Thus, it becomes possible to further suppress the consumption of resources in the macro eNodeB 100. For example, it is possible to suppress the consumption of memory resources, radio resources (such as radio resources for system information), process resources, and the like, required to supply the system information about the CC 2. In particular, since a large number of the pico cells 21 can exist within the macro cell 11, it is possible to significantly suppress the consumption of resources.

Note that, as illustrated in the modification example of the first embodiment, the system information supplied in the CC 1 may include system information about the CC 2.

Thus, the UE 300 can acquire the system information about the CC 2 of the pico cell 21 in advance, before entering the pico cell 21.

Further, the system information supplied in the CC 1 may include part of the system information about the CC 2.

Thus, compared with a case where the macro eNodeB 100 supplies all the system information about the CC 2, the consumption of resources in the macro eNodeB 100 can be suppressed.

Furthermore, the part of the system information about the CC 2 may be common to system information about another CC other than the CC 1 and the CC 2, among pieces of the system information about the CC 2.

Thus, it becomes possible to supply the system information more efficiently than in a case where system information for each CC is supplied individually. In addition, if the information is common to the CCs, since the information amount is not increased in proportion to the number of pico cells 21, the consumption of resources in the macro eNodeB 100 can be suppressed.

Furthermore, for example, the macro eNodeB 100 supplies information about MBMS (that is, the MBMS information) in the CC 1 of the macro cell 11 to the pico eNodeB 200. Then, the MBMS information is supplied by the macro eNodeB 100 to the UE 300.

Thus, it becomes unnecessary for the UE 300 to keep acquiring the system information about the CC 1 in order to determine which subframe is the MBMS subframe in the CC 1. Therefore, the load on the UE 300 is reduced.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although the example of notifying the barring of connection (specifically, the example of supplying the access barring information) has been shown as a method in which the macro eNodeB does not allow the UE satisfying the connection barring conditions to be connected in a radio resource in the frequency band (CC) of the macro cell, the present disclosure is not limited to this example. Another method of not allowing the UE to be connected in the frequency band may be employed. As an example, a node other than the macro eNodeB (such as a pico eNodeB) may notify the barring of connection instead of the macro eNodeB. As another example, the UE satisfying the connection barring conditions may be prevented from being connected in a radio resource by making the UE satisfying the connection barring conditions be in an idle state (RRC_Idle) in a radio resource among UEs that are connected in a radio resource (that is, RRC_Connected). Even if the UE satisfying the connection barring conditions enters RRC_Connected, after that, the UE may be restored to RRC_Idle and the UE satisfying the connection barring conditions may be prevented from being connected in a radio resource.

Furthermore, although the example of processing focusing on the first frequency band used for radio communication in the macro cell and the second frequency band used for radio communication in the pico cell has been described above, the present disclosure is not limited to this example. Of course, another combination of the frequency band of the macro cell and the frequency band of the pico cell that are mutually synchronized may be subjected to the same processing.

The example indicating that the mutually synchronized frequency bands (for example, the mutually synchronized CCs) are mutually synchronized in both of the time direction and the frequency direction has been described, but the present disclosure is not limited to this example. For example, the mutually synchronized frequency bands may be frequency bands synchronized in the time direction. For example, the mutually synchronized frequency bands may be frequency bands synchronized in the frequency direction. For example, the mutually synchronized frequency bands may be frequency bands synchronized in one of the time direction and the frequency direction.

The pico cell can be exemplified as an example of the small cell, but the present disclosure is not limited to this example. The small cell may be a cell other than the pico cell (for example, a nano cell or a femto cell) partially or entirely overlapping with the macro cell.

The example in which the communication system conforms to LTE-A has been described, but the present disclosure is not limited to this example. For example, the communication system may be a system that conforms to a different standard in 3GPP. For example, the communication system may be a system that conforms to a future standard in 3GPP.

Also, the processing steps in the communication control processing in this specification are not strictly limited to being executed in a time series following the sequence described in a flowchart. For example, the processing steps in the communication control processing may be executed in a sequence that differs from a sequence described herein as a flowchart, and furthermore may be executed in parallel.

In addition, it is possible to create a computer program for causing hardware such as a CPU, ROM, and RAM built into a communication control device (for example, the macro eNodeB) or a terminal device (for example, the UE) to exhibit functions similar to each structural element of the foregoing communication control device.

Additionally, the present technology may also be configured as below.

(1)

A communication control device including:

a communication control unit configured to control radio communication in a macro cell that overlaps with part or whole of a small cell, wherein a first frequency band used for the radio communication in the macro cell is synchronized with a second frequency band used for radio communication in the small cell, wherein a synchronization signal used for synchronization in the first frequency band is transmitted in the first frequency band, wherein the communication control unit prevents a terminal device satisfying certain conditions from being connected in a radio resource in the first frequency band, and wherein the certain conditions include synchronization of the terminal device in the second frequency band utilizing a synchronization result by the synchronization signal.

(2)

The communication control device according to (1), wherein the certain conditions further include refraining of the terminal device from transmitting and receiving data using the first frequency band.

(3)

The communication control device according to (1) or (2), wherein the communication control unit supplies system information in the first frequency band, and wherein the system information excludes system information about the second frequency band.

(4)

The communication control device according to (1) or (2), wherein the communication control unit supplies system information in the first frequency band, and wherein the system information includes system information about the second frequency band.

(5)

The communication control device according to (4), wherein the system information supplied in the first frequency band includes part of the system information about the second frequency band.

(6)

The communication control device according to (5), wherein the part of the system information about the second frequency band is information common to system information about another frequency band other than the first frequency band and the second frequency band, among pieces of the system information about the second frequency band.

(7)

The communication control device according to any one of (1) to (6), wherein the communication control unit prevents the terminal device from being connected in a radio resource in the first frequency band by notifying the terminal device of barring of connection of a device satisfying the certain conditions in the first frequency band.

(8)

The communication control device according to (7), wherein the communication control unit notifies the terminal device of the barring of connection using system information supplied in the first frequency band.

(9)

The communication control device according to any one of (1) to (8), wherein the communication control unit supplies information about a multimedia broadcast and multicast service (MBMS) in the first frequency band to a base station of the small cell, and wherein the information about the MBMS is supplied to the terminal device by the base station of the small cell.

(10)

The communication control device according to any one of (1) to (9), wherein the second frequency band is a frequency band in which a synchronization signal refrains from being transmitted in at least any one of subframes each of which is a unit of time in radio communication.

(11)

The communication control device according to (10), wherein a number of synchronization signals transmitted in the second frequency band is smaller than a number of the synchronization signals transmitted in the first frequency band.

(12)

The communication control device according to (11), wherein the number of synchronization signals transmitted in the second frequency band is smaller than a number of synchronization signals required for synchronization in the second frequency band.

(13)

The communication control device according to any one of (1) to (12), wherein the synchronization signal is a common reference signal.

(14)

A communication control method including:

controlling radio communication in a macro cell that overlaps with part or whole of a small cell, wherein a first frequency band used for the radio communication in the macro cell is synchronized with a second frequency band used for radio communication in the small cell, wherein a synchronization signal used for synchronization in the first frequency band is transmitted in the first frequency band, wherein the controlling of the radio communication in the macro cell includes preventing a terminal device satisfying certain conditions from being connected in a radio resource in the first frequency band, and wherein the certain conditions include synchronization of the terminal device in the second frequency band utilizing a synchronization result by the synchronization signal.

(15)

A terminal device including:

a communication control unit configured to control radio communication performed by the terminal device in a macro cell and a small cell partially or entirely overlapping with the macro cell, wherein a first frequency band used for the radio communication in the macro cell is synchronized with a second frequency band used for the radio communication in the small cell, wherein a synchronization signal used for synchronization in the first frequency band is transmitted in the first frequency band, wherein the communication control unit prevents the terminal device from being connected in a radio resource in the first frequency band when the terminal device satisfies certain conditions, and wherein the certain conditions include synchronization of the terminal device in the second frequency band utilizing a synchronization result by the synchronization signal.

(16)
The terminal device according to (15),
wherein the communication control unit refrains from acquiring system information about the second frequency band from system information supplied in the first frequency band.

(17)
The terminal device according to (15),
wherein the communication control unit acquires system information about the second frequency band from system information supplied in the first frequency band.

(18)
The terminal device according to any one of (15) to (17),
wherein the communication control unit prevents the terminal device from being connected in a radio resource in the first frequency band by refraining from performing a connection procedure to be connected in a radio resource in the first frequency band.

(19)
The terminal device according to (18),
wherein the communication control unit refrains from performing the connection procedure to be connected in a radio resource in the first frequency band upon receiving a notification of barring of connection of a device satisfying the certain conditions in the first frequency band.

(20)
The terminal device according to (18),
wherein the communication control unit spontaneously refrains from performing the connection procedure to be connected in a radio resource in the first frequency band when the terminal device satisfies the certain conditions.

REFERENCE SIGNS LIST 1 communication system
1 macro cell
21 pico cell
100 macro eNodeB
151 communication control unit
200 pico eNodeB
300 UE (user equipment)
341, 351 communication control unit

The invention claimed is:
1. A communication control device, comprising:
a communication control unit configured to:
control radio communication in a macro cell that overlaps with at least a part of a small cell,
wherein a first frequency band associated with the radio communication in the macro cell is synchronized with a second frequency band associated with the radio communication in the small cell; and
prevent a terminal device to connect in a radio resource of the macro cell based on synchronization of the terminal device in the second frequency band,
wherein the synchronization of the terminal device in the second frequency band is based on at least one of first synchronization signals transmitted in the second frequency band or second synchronization signals transmitted in the first frequency band, and
wherein a first number of the first synchronization signals is smaller than a second number of the second synchronization signals.

2. The communication control device according to claim 1, wherein the terminal device is refrained from usage of the first frequency band for transmission and reception of data.

3. The communication control device according to claim 1,
wherein the communication control unit is further configured to supply first system information of the first frequency band, wherein the first system information is supplied in the first frequency band, and
wherein the first system information excludes second system information of the second frequency band.

4. The communication control device according to claim 1, wherein the communication control unit is further configured to supply first system information of the first frequency band, wherein the first system information is supplied in the first frequency band.

5. The communication control device according to claim 1, wherein the communication control unit is further configured to supply first system information supplied of the first frequency band, wherein the first system information is supplied in the first frequency band, and
wherein the first system information includes at least a part of second system information of the second frequency band.

6. The communication control device according to claim 5,
wherein the at least part of the second system information of the second frequency band is information common between third system information of a third frequency band and the second frequency band, and
wherein the second frequency band and the third frequency band are different.

7. The communication control device according to claim 1, wherein the communication control unit is further configured to prevent the terminal device to connect in the radio resource of the macro cell based on a notification to bar connection to the terminal device.

8. The communication control device according to claim 7,
wherein the communication control unit is further configured to:
supply system information in the first frequency band; and
notify the terminal device of barred connection based on the system information.

9. The communication control device according to claim 1,
wherein the communication control unit is further configured to supply information indicating a multimedia broadcast and multicast service (MBMS) in the first frequency band, wherein the information indicating the MBMS is supplied to a base station of the small cell, and
wherein the information indicating the MBMS is further supplied to the terminal device by the base station of the small cell.

10. The communication control device according to claim 1,
wherein transmission of at least one first synchronization signal of the first synchronization signals in the second frequency band is restricted in at least one subframe of a plurality of subframes, and
wherein each subframe of the plurality of subframes is a unit of time in the radio communication in the small cell.

11. The communication control device according to claim 1, wherein the first number of the first synchronization signals is smaller than a third number of third synchronization signals that are required for the synchronization of the terminal device in the second frequency band.

12. The communication control device according to claim 1,
wherein the communication control unit is further configured to transmit the second synchronization signals in the first frequency band, and
wherein at least one second synchronization signal of the second synchronization signals is a common reference signal.

13. A communication control method, comprising:
controlling radio communication in a macro cell that overlaps with at least a part of a small cell,
wherein a first frequency band associated with the radio communication in the macro cell is synchronized with a second frequency band associated with the radio communication in the small cell; and
preventing a terminal device to connect in a radio resource of the macro cell based on synchronization of the terminal device in the second frequency band,
wherein the synchronization of the terminal device in the second frequency band is based on at least one of first synchronization signals transmitted in the second frequency band or second synchronization signals transmitted in the first frequency band, and
wherein a first number of the first synchronization signals is smaller than a second number of the second synchronization signals.

14. A terminal device, comprising:
a communication control unit configured to:
control radio communication by the terminal device in a macro cell and a small cell that at least partially overlaps with the macro cell,
wherein a first frequency band associated with the radio communication in the macro cell is synchronized with a second frequency band associated with the radio communication in the small cell, and
prevent the terminal device to connect in a radio resource of the macro cell based on synchronization of the terminal device in the second frequency band,
wherein the synchronization of the terminal device in the second frequency band is based on at least one of first synchronization signals transmitted in the second frequency band or second synchronization signals transmitted in the first frequency band, and
wherein a first number of the first synchronization signals is smaller than a second number of the second synchronization signals.

15. The terminal device according to claim 14,
wherein the communication control unit is further configured to refrain from acquisition of first system information, of the second frequency band, from second system information, and
wherein the second system information is supplied in the first frequency band.

16. The terminal device according to claim 14,
wherein the communication control unit is further configured to acquire first system information, of the second frequency band, from second system information, and
wherein the second system information is supplied in the first frequency band.

17. The terminal device according to claim 14, wherein the communication control unit is further configured to prevent the terminal device to connect in the radio resource of the macro cell based on execution of a connection procedure corresponding to establishment of a connection in the radio resource of the macro cell.

18. The terminal device according to claim 17, wherein the communication control unit is further configured to refrain from the execution of the connection procedure based on reception of a notification of barred connection.

19. The terminal device according to claim 17,
wherein the communication control unit is further configured to refrain from the execution of the connection procedure based on satisfaction of connection barring conditions by the terminal device, and
wherein the connection barring conditions are based on the synchronization of the terminal device in the second frequency band.

* * * * *